US012626920B2

(12) United States Patent
Murata et al.

(10) Patent No.: US 12,626,920 B2
(45) Date of Patent: May 12, 2026

(54) NIOBIUM-TITANIUM OXIDE, ACTIVE MATERIAL, ELECTRODE, SECONDARY BATTERY, BATTERY PACK, AND VEHICLE

(71) Applicant: KABUSHIKI KAISHA TOSHIBA, Tokyo (JP)

(72) Inventors: Yoshiaki Murata, Kawasaki (JP); Kakuya Ueda, Kawasaki (JP); Yasuhiro Harada, Isehara (JP); Kazuki Ise, Kawasaki (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 595 days.

(21) Appl. No.: 18/169,982

(22) Filed: Feb. 16, 2023

(65) Prior Publication Data

US 2024/0088385 A1    Mar. 14, 2024

(30) Foreign Application Priority Data

Sep. 8, 2022    (JP) ................................. 2022-143283

(51) Int. Cl.
*H01M 4/58* (2010.01)
*H01M 50/296* (2021.01)
*H01M 4/02* (2006.01)

(52) U.S. Cl.
CPC ....... *H01M 4/5825* (2013.01); *H01M 50/296* (2021.01); *H01M 2004/027* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 10,930,930 | B2 * | 2/2021 | Harada | ............ H01M 10/4257 |
| 2021/0376307 | A1 | 12/2021 | Harada et al. | |

FOREIGN PATENT DOCUMENTS

| | | |
|---|---|---|
| CN | 102479950 A | 5/2012 |
| CN | 114188525 A | 3/2022 |
| JP | 2015-084321 A | 4/2015 |
| JP | 2016-177972 A | 10/2016 |
| JP | 2017-069215 A | 4/2017 |
| JP | 2017-134972 A | 8/2017 |
| JP | 2019-063945 A | 4/2019 |
| JP | 2020-47374 A | 3/2020 |
| JP | 2021-190250 A | 12/2021 |

OTHER PUBLICATIONS

Gasperin, M., "Affinement de la structure de TiNb2O7 et repartition des cations" Journal of Solid State Chemistry, vol. 53, pp. 144-147, 1984 (with English Translation).

(Continued)

*Primary Examiner* — Wyatt P McConnell
(74) *Attorney, Agent, or Firm* — Oblon, McClelland, Maier & Neustadt, L.L.P.

(57) ABSTRACT

In general, according to one embodiment, a niobium-titanium oxide is provided. The niobium-titanium oxide satisfies Formulae (1) to (3) below in an L*a*b* color space according to Japanese Industrial Standard JIS Z 8722:2009:

$$95.0 \leq L^* \leq 100 \qquad (1)$$

$$-1.0 \leq a^* \leq 1.0 \qquad (2)$$

$$-1.0 \leq b^* \leq 6.0 \qquad (3).$$

19 Claims, 8 Drawing Sheets

(56)             References Cited

OTHER PUBLICATIONS

Zhang, Y., et al. "Oxygen vacancy regulated $TiNb_2O_7$ compound with enhanced electrochemical performance used as anode material in Li-ion batteries" Electrochimica Acta, vol. 330, 135299, 2020, 10 pages.

Park, H. et al., "Porosity-Controlled $TiNb_2O_7$ Microspheres with Partial Nitridation as a Practical Negative Electrode for High-Power Lithium-ion Batteries" Advanced Energy Materials, vol. 5, issue 8, 1401945, 2015, 7 pages.

Eri Miura Fujiwara et al. "Color tone and interfacial microstructure of white oxide layer on commercially pure Ti and Ti—Nb—Ta—Zr alloys", Japanese Journal of Applied Physics, 2014. 53, 11RD02.

Japanese Office Action dated Nov. 18, 2025, Issued in Japanese Patent Application No. 2022-143283 (with English translation; Documents 16-21 and 24 being cited therein).

Chinese Office Action dated Mar. 23, 2026, issued in Chinese Patent Application No. 202310175292.1 (with English translation; Document 18 being cited therein).

* cited by examiner

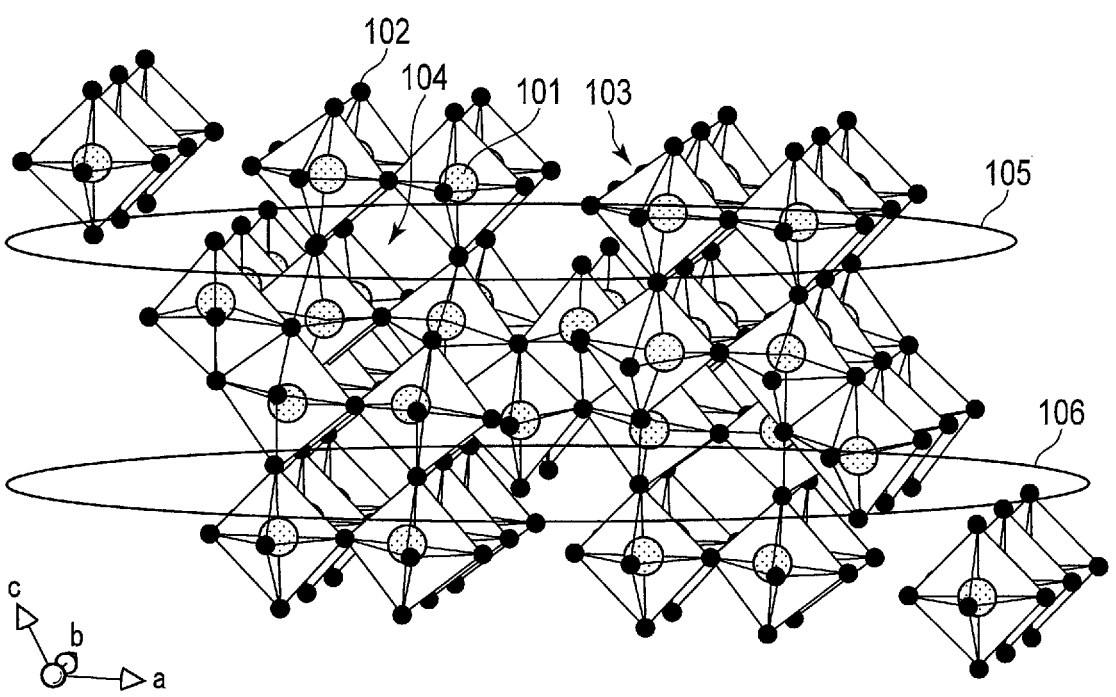
F I G. 1
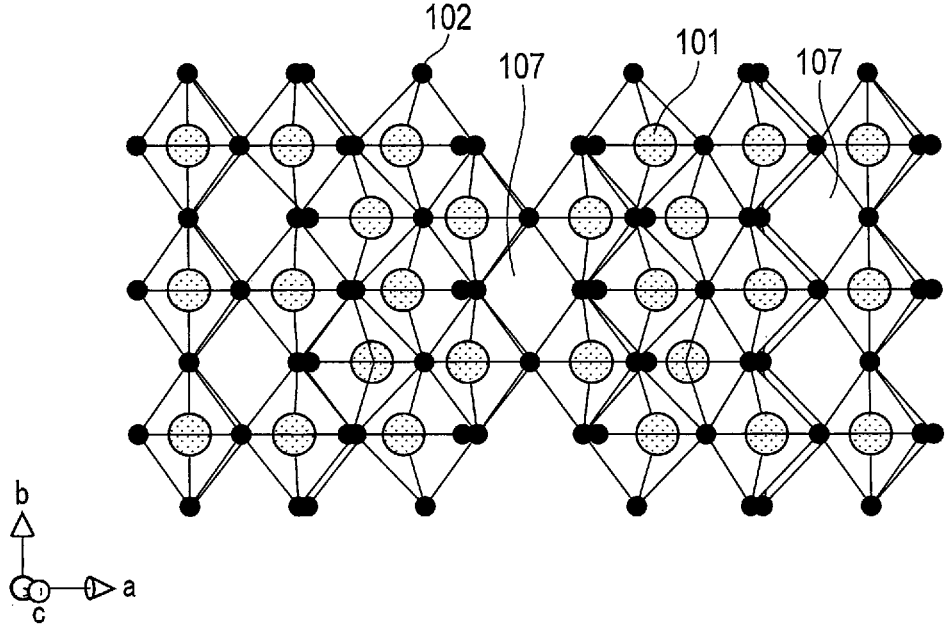
F I G. 2

Center of gravity

● :Measurement point

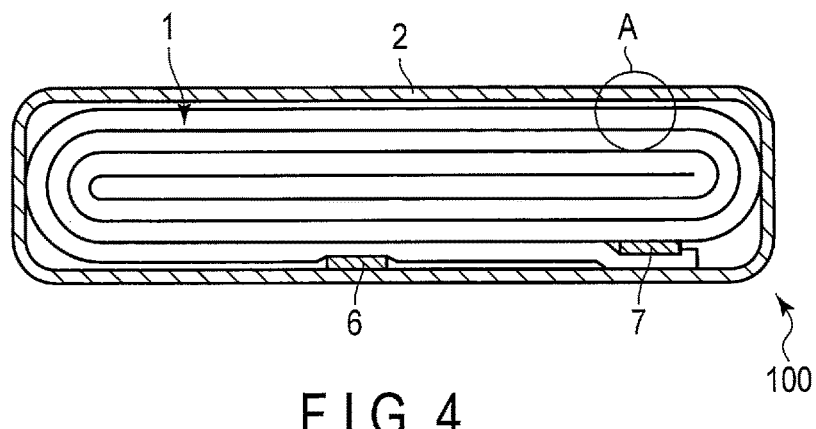
F I G. 4
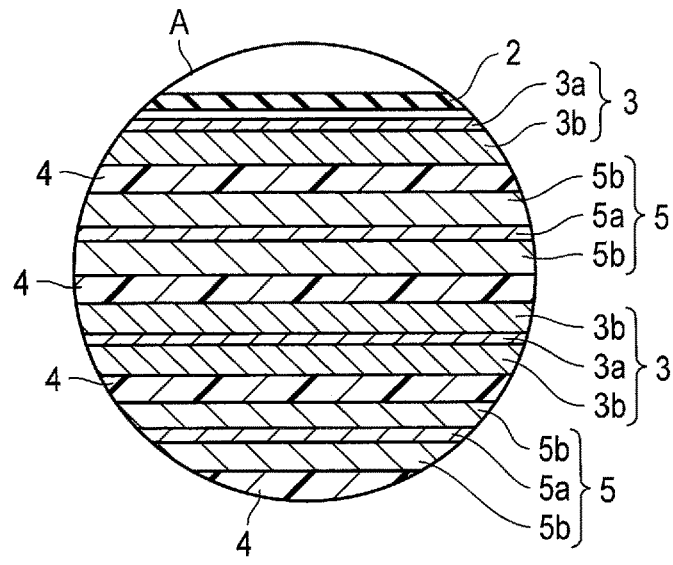
F I G. 5
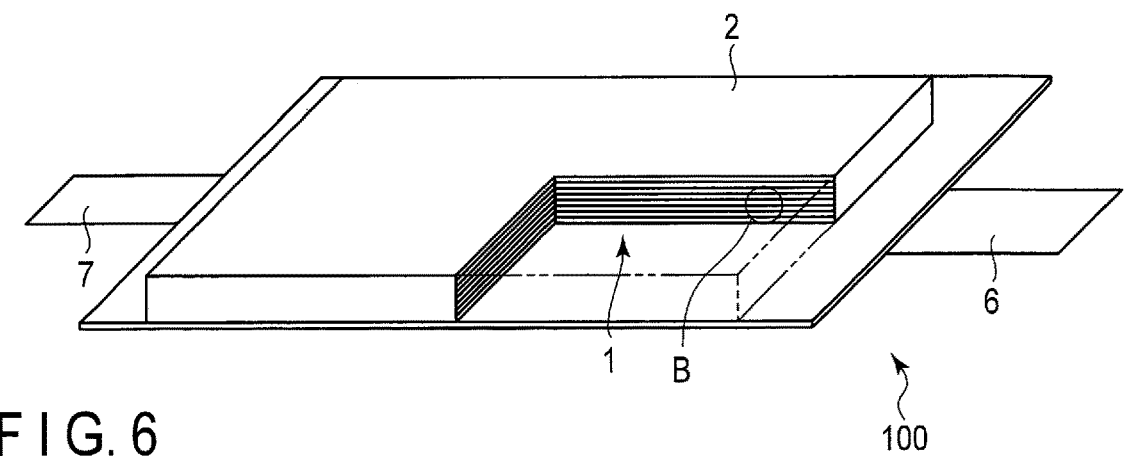
F I G. 6

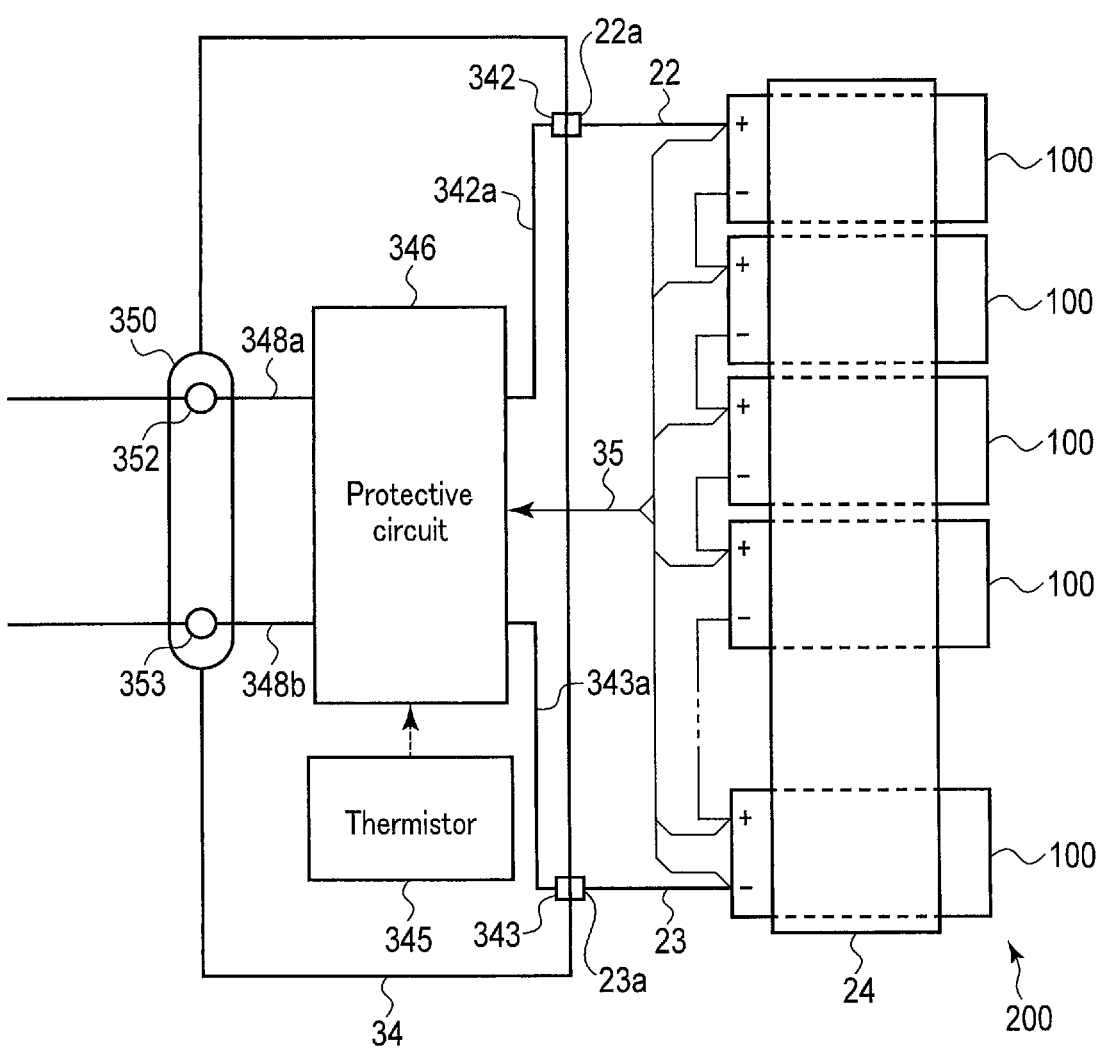
F I G. 10
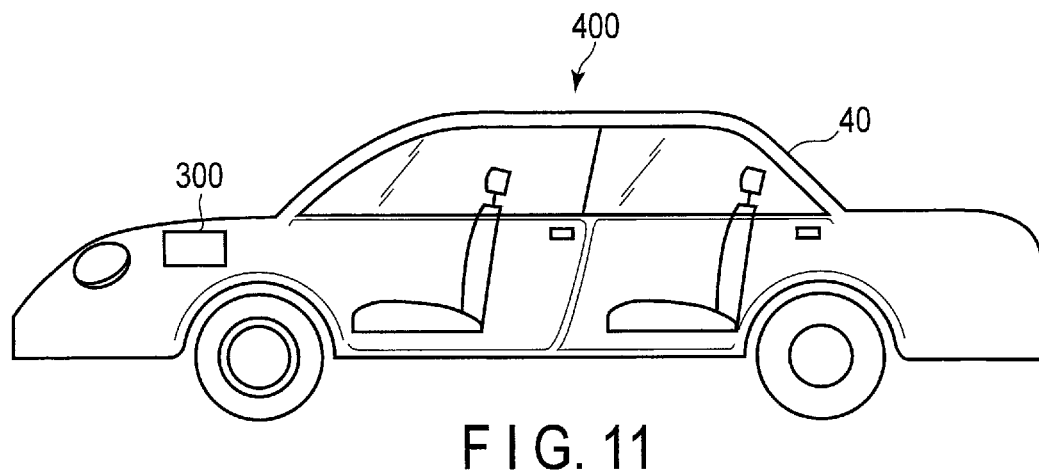
F I G. 11

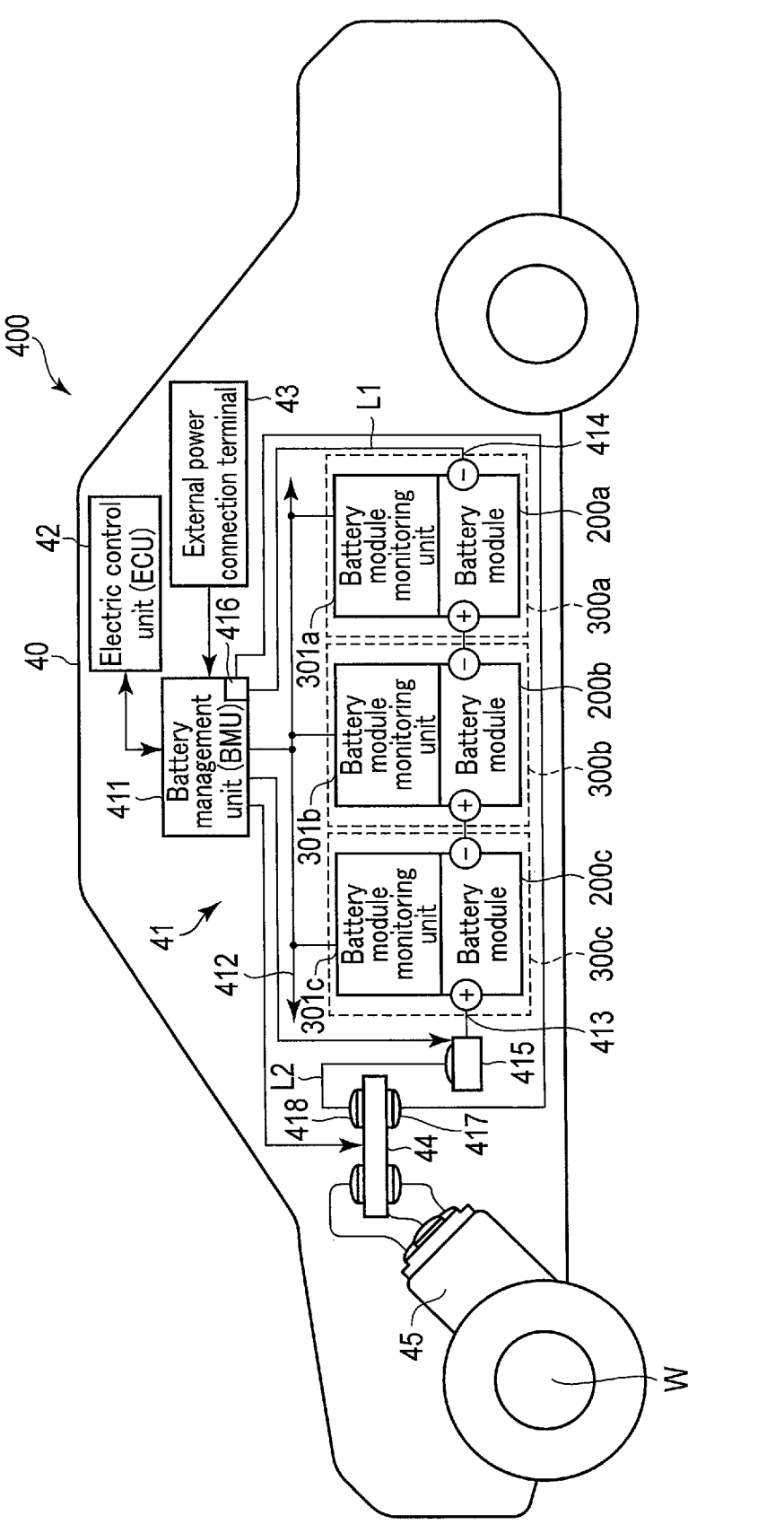
F I G. 12

NIOBIUM-TITANIUM OXIDE, ACTIVE MATERIAL, ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2022-143283, filed Sep. 8, 2022, the entire contents of which are incorporated herein by reference.

FIELD

Embodiments described herein relate generally to a niobium-titanium oxide, an active material, an electrode, a secondary battery, a battery pack, and a vehicle.

BACKGROUND

These days, secondary batteries such as nonaqueous electrolyte secondary batteries such as a lithium ion secondary battery are being actively researched and developed as high energy density batteries. Secondary batteries such as non-aqueous electrolyte secondary batteries are expected as power sources for vehicles such as hybrid electric vehicles and electric vehicles, uninterruptible power supplies for mobile phone base stations, and the like. Hence, the secondary battery is required to be excellent not only in high energy density but also in other performances such as rapid charge-discharge performance and long-term reliability. For example, in a secondary battery capable of rapid charging and discharging, not only is the charging time greatly shortened, but also power performance of a vehicle such as a hybrid electric vehicle can be improved and regenerative energy of power can be efficiently recovered.

To enable rapid charging and discharging, it is necessary that electrons and lithium ions be able to rapidly move between the positive electrode and the negative electrode. However, if a battery including a carbon-based negative electrode is repeatedly subjected to rapid charging and discharging, dendrite deposition of metal lithium occurs on the electrode, and there has been a concern of heat generation or ignition due to an internal short circuit.

Thus, a battery using a metal composite oxide for a negative electrode instead of a carbonaceous material has been developed. Among such batteries, a battery using a titanium oxide for a negative electrode is capable of stable rapid charging and discharging, and has characteristics of a longer life than in a case where a carbon-based negative electrode is used.

However, the titanium oxide has a higher potential with respect to metal lithium than the carbonaceous material, that is, the titanium oxide is nobler. In addition, the titanium oxide has a low capacity per weight. Hence, a battery using a titanium oxide for a negative electrode has a problem of low energy density.

For example, the electrode potential of the titanium oxide is about 1.5 V (vs. Li/Li$^+$) with metal lithium as a standard, which is higher (nobler) than the potential of the carbon-based negative electrode. The potential of the titanium oxide is electrochemically restricted because it is caused by an oxidation-reduction reaction between Ti$^{3+}$ and Ti$^{4+}$ at the time of electrochemically inserting and extracting lithium. There is also a fact that rapid charging and discharging of lithium ions can be stably performed at a high electrode potential of about 1.5 V (vs. Li/Li$^+$). Therefore, it has so far been difficult to reduce the electrode potential in order to improve the energy density.

On the other hand, regarding the capacity per unit weight, the theoretical capacity of titanium dioxide (an anatase structure) is about 165 mAh/g, and the theoretical capacity of a spinel-type lithium-titanium composite oxide such as Li$_4$Ti$_5$O$_{12}$ is also about 180 mAh/g. On the other hand, the theoretical capacity of a common graphite-based electrode material is 385 mAh/g or more. Thus, the capacity density of the titanium oxide is much lower than that of the carbon-based negative electrode. This is because the crystal structure of the titanium oxide has few sites for inserting lithium, and lithium is easily stabilized in the structure and therefore the substantial capacity is reduced.

In view of the above, a new electrode material containing Ti and Nb is being studied. Such a niobium-titanium oxide material is expected to have high charge-discharge capacity. In particular, the composite oxide represented by TiNb$_2$O$_7$ has a high theoretical capacity exceeding 380 mAh/g. Therefore, the niobium-titanium oxide is expected as a high-capacity material to replace Li$_4$Ti$_5$O$_{12}$.

BRIEF DESCRIPTION OF THE DRAWINGS

FIG. 1 is a schematic diagram showing a crystal structure of a niobium-titanium oxide Nb$_2$TiO$_7$.

FIG. 2 is a schematic diagram showing a case where the crystal structure of FIG. 1 is observed from another direction.

FIG. 4 is a cross-sectional view schematically showing an example of a secondary battery according to an embodiment.

FIG. 5 is an enlarged cross-sectional view of part A of the secondary battery shown in FIG. 4.

FIG. 6 is a partially cutaway perspective view schematically showing another example of the secondary battery according to the embodiment.

FIG. 10 is a block diagram showing an example of an electric circuit of the battery pack shown in FIG. 9.

FIG. 11 is a cross-sectional view schematically showing an example of a vehicle according to the embodiment.

FIG. 12 is a diagram schematically showing another example of the vehicle according to the embodiment.

DETAILED DESCRIPTION

Figure 3:
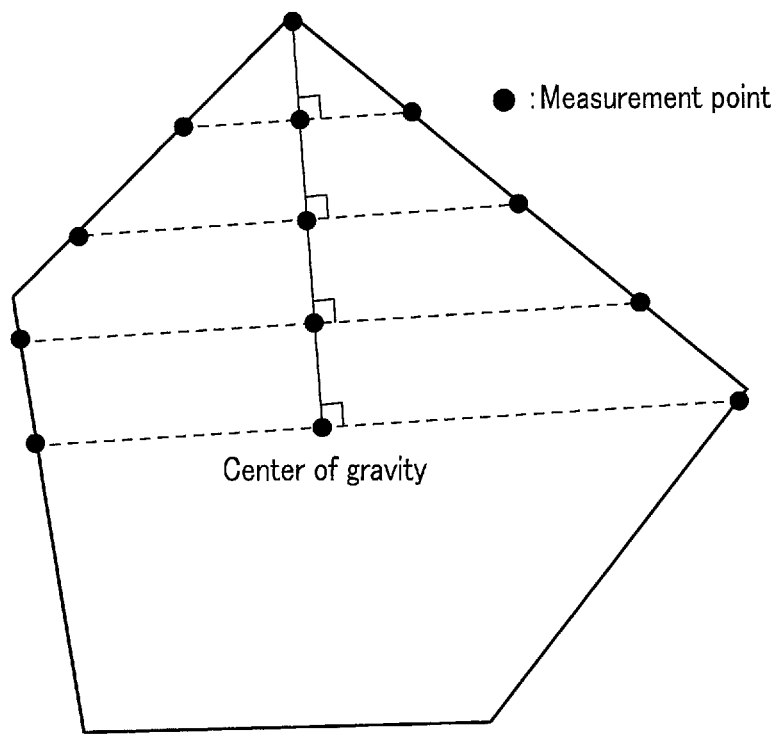
FIG. 3 is a plan view schematically showing a particle to be measured in transmission electron microscope (TEM) observation.

In general, according to one embodiment, a niobium-titanium oxide is provided. The niobium-titanium oxide satisfies Formulae (1) to (3) below in an L*a*b* color space according to Japanese Industrial Standard JIS Z 8722:2009:

$$95.0 \leq L^* \leq 100.0 \tag{1}$$

$$-1.0 \leq a^* \leq 1.0 \tag{2}$$

$$-1.0 \leq b^* \leq 6.0 \tag{3}.$$

According to another embodiment, an active material includes the niobium-titanium oxide according to the embodiment.

According to another embodiment, an electrode includes an active material-containing layer, wherein the active material-containing layer contains the active material according to the embodiment.

According to another embodiment, a secondary battery includes:

a positive electrode;

a negative electrode; and an electrolyte, wherein the negative electrode is the electrode according to the embodiment.

According to another embodiment, a battery pack includes the secondary battery according to the embodiment.

According to another embodiment, a vehicle includes the battery pack according to the embodiment.

Hereinbelow, embodiments are described with reference to the drawings. Common configurations are marked with the same reference numerals throughout the embodiments and a repeated description is omitted. Each drawing is a schematic diagram for promoting the description and understanding of the embodiment, and some shapes, dimensions, ratios, etc. are different from those of the actual device, but these can be appropriately changed in design in view of the following description and known technology.

A niobium-titanium oxide is an oxide containing niobium and titanium. The niobium-titanium oxide can be synthesized by, for example, a solid phase method using a Nb source and a Ti source as source materials. The synthesized niobium-titanium oxide is then subjected to pulverization up to an appropriate particle size. By performing pulverization, an amorphous phase can be formed on the particle surface. The amorphous phase is inferior in electron conductivity and lithium ion conductivity to a portion having a normal crystal phase. Therefore, a secondary battery including an active material having an amorphous phase tends to degrade in battery capacity and charge-discharge characteristics (rate characteristics).

The present inventors conducted extensive studies to suppress the generation of an amorphous phase having poor electron conductivity, and have found out that, in a surface layer of a niobium-titanium oxide in which the particle surface has a specific color, no amorphous phase is present or only slight amounts of amorphous phases are present.

First Embodiment

According to a first embodiment, a niobium-titanium oxide is provided. The niobium-titanium oxide satisfies Formulae (1) to (3) below in the L*a*b* color space measured based on Japanese Industrial Standard JIS Z 8722:2009.

$$95.0 \leq L^* \leq 100.0 \tag{1}$$

$$-1.0 \leq a^* \leq 1.0 \tag{2}$$

$$-1.0 \leq b^* \leq 6.0 \tag{3}$$

A color satisfying all of Formulae (1) to (3) above is generally pale yellow. In the case of a niobium-titanium oxide having a color satisfying all of Formulae (1) to (3) above, the band gap is narrower than in the case of not satisfying Formulae (1) to (3). In a substance having a narrower band gap, electron excitation is more likely to occur. That is, a substance having a narrow band gap has high electron conductivity. In addition, the amount of metal elements involved in battery reaction is larger; thus, the electrode potential can be lowered, and thereby a high battery voltage can be achieved. That is, a secondary battery exhibiting high capacity can be obtained.

A method for producing a niobium-titanium oxide having a color satisfying Formulae (1) to (3) above will be described in detail later; examples thereof include a technique of adding an element (hereinafter, referred to as an element A) that is solid-dissolved without deficiency in the crystal lattice of a niobium-titanium oxide and without inhibiting the movement of Li ions. Alternatively, for example, a technique of partially causing deficiency in oxygen atoms included in the crystal lattice or a technique of adding nitrogen atoms into the crystal lattice can be given. These techniques may be performed in combination, as appropriate. That is, an element A may be added to a niobium-titanium oxide, and furthermore oxygen deficiency and/or nitrogen addition may be performed.

In a case where the niobium-titanium oxide contains an element A, the element A functions as what is called a donor. That is, an element A that has an energy level in the band gap (forbidden band) between the conduction band and the valence band of the niobium-titanium oxide exists. Electrons existing at this energy level are easily excited to the conduction band, and therefore contribute to an improvement in electron conductivity.

On the other hand, in a case where the niobium-titanium oxide has oxygen deficiency or contains added nitrogen atoms, holes are generated at an energy level near the valence band. This hole functions as what is called an acceptor. Holes are easily excited to the valence band, and therefore contribute to an improvement in electron conductivity.

As above, the band gap of the niobium-titanium oxide is narrowed in any case; thus, high capacity and excellent rate characteristics can be achieved. The present inventors have found out that the color of the niobium-titanium oxide changes as the band gap narrows. Furthermore, the present inventors have found out that a niobium-titanium oxide capable of achieving excellent battery characteristics has a specific color defined by the L*a*b* color space. This color is a color satisfying all of Formulae (1) to (3) above.

In the specification and claims of the present application, the L*a*b* color space refers to a color space measured based on Japanese Industrial Standard JIS Z 8722:2009. The L*a*b* color space is, for example, an index used to represent an object color. The L*a*b* color space is an index standardized by the International Commission on Illumination (CIE) in 1976. In the L*a*b* color space, L* represents brightness, and a* and b* represent hues as chromaticity. A larger L* indicates a higher brightness. a* and b* indicate color directions. a* indicates a red direction, and -a* indicates a green direction. b* indicates a yellow direction, and -b* indicates a blue direction.

L* of the surface of the niobium-titanium oxide falls within the range of 95.0 or more and 100.0 or less. In a case where L* is less than 95.0, for example, the content of the element A is too large, or oxygen deficiency or nitrogen addition is large. In this case, although the electron conductivity is excellent, the electrode potential is too high, and accordingly the energy density tends to decrease. The upper limit value of L* is 100 by definition. L* is desirably 99.0 or less. This is because in a case where L* exceeds 99.0, the content of the element A may be insufficient or oxygen deficiency or nitrogen addition may be small. In this case, for example, the generation of an amorphous phase cannot be sufficiently suppressed, and therefore the electron conductivity tends to degrade. $L^*$ is preferably 95.0 or more and 99.0 or less, and more preferably in the range of 95.5 or more and 98.5 or less.

$a^*$ is in the range of $-1.0$ or more and 1.0 or less. In a case where $a^*$ is in this range, the niobium-titanium oxide does not experience generation of a heterogeneous phase due to additive elements, and has a highly crystalline structure. In this case, high rate characteristics can be achieved without inhibiting lithium ion conduction in the active material particle.

$b^*$ is in the range of $-1.0$ or more and 6.0 or less. In a case where $b^*$ is less than $-1.0$, for example, the content of the element A is too large, or oxygen deficiency or nitrogen addition is large. In this case, although the electron conductivity is excellent, the electrode potential is too high, and accordingly the energy density tends to decrease. In a case where $b^*$ exceeds 6.0, the content of the element A may be insufficient, or oxygen may be insufficient or nitrogen addition may be small. In this case, for example, the generation of an amorphous phase cannot be sufficiently suppressed, and therefore the electron conductivity tends to degrade. $b^*$ is preferably in the range of 1.0 or more and 5.0 or less.

<Form of Niobium-Titanium Oxide>

The form of the niobium-titanium oxide according to the embodiment is not particularly limited. The niobium-titanium oxide can take, for example, a form of primary particles or a form of secondary particles formed by aggregation of primary particles. The niobium-titanium oxide may be a mixture of primary particles and secondary particles. The niobium-titanium oxide may have a granular or massive form having larger dimensions than a body referred to as a particle.

The niobium-titanium oxide can take, for example, a powdery form in which primary particles and secondary particles are gathered. The average particle size (D50) of the niobium-titanium oxide powder is in the range of 0.5 μm to 30 μm. Here, the "average particle size (D50)" refers to a particle size at which a cumulative volume distribution is 50% in a particle size distribution chart obtained by a laser diffraction scattering method described later.

Measurement of the $L^*a^*b^*$ color space based on Japanese Industrial Standard JIS Z 8722:2009 can be performed on niobium-titanium oxides having various forms. The measurement can be performed on, for example, a primary particle, a secondary particle, a mixture of primary particles and secondary particles, or a powder containing these. A specific measurement method will be described later.

The niobium-titanium oxide according to the embodiment preferably contains a $Nb_2TiO_7$ phase as a main phase. The $Nb_2TiO_7$ phase is a niobium-titanium composite oxide phase represented by $Nb_2TiO_7$ as a representative composition. The $Nb_2TiO_7$ phase has a symmetry of the space group C2/m, and has a crystal structure having atomic coordinates described in Non-Patent Literature 1 (M. Gasperin, Journal of Solid State Chemistry 53, pp 144-147 (1984)). The $Nb_2TiO_7$ phase may have a monoclinic crystal structure. The crystal phase of the niobium-titanium oxide is not limited to the $Nb_2TiO_7$ phase, and may further include a Nb-rich phase described later. Whether the niobium-titanium oxide contains the $Nb_2TiO_7$ phase as a main phase or not is determined using, as a criterion, the fact that $2\theta$ of the maximum peak in an XRD pattern appears at $26.0\pm0.1°$.

As an example of the $Nb_2TiO_7$ phase, a schematic diagram of a crystal structure of monoclinic $Nb_2TiO_7$ is shown in FIGS. 1 and 2.

As shown in FIG. 1, in the crystal structure of monoclinic $Nb_2TiO_7$, metal ions 101 and oxide ions 102 constitute a skeleton structure portion 103. In the positions of the metal ions 101, Nb ions and Ti ions are randomly arranged at a ratio of Nb:Ti=2:1. Such skeleton structurer portions 103 are three-dimensionally alternately arranged, and thereby void portions 104 exist between skeleton structure portions 103. The void portion 104 serves as a host of lithium ions. 0 moles up to 5.0 moles of lithium ions can be inserted into the crystal structure. Therefore, the composition in a case where 0 to 5.0 moles of lithium ions are inserted can be represented by $Li_xNb_2TiO_7$ ($0 \le x \le 5$).

In FIG. 1, region 105 and region 106 are portions having two-dimensional channels in the [100] direction and the [010] direction. As both regions are shown in FIG. 2, void portions 107 exist in the [001] direction in the crystal structure of monoclinic $Nb_2TiO_7$. The void portion 107 has a tunnel structure advantageous for lithium ion conduction, and serves as a conductive path in the [001] direction connecting region 105 and region 106. By this conductive path being present, lithium ions can move between region 105 and region 106. The niobium-titanium oxide has a lithium insertion potential of about 1.5 V (vs. Li/Li$^+$). Therefore, an electrode containing a niobium-titanium oxide as an active material can provide a battery capable of stable repeated rapid charging and discharging.

Furthermore, in the above crystal structure, if lithium ions are inserted into the void portion 104, metal ions 101 included in the skeleton are reduced to trivalence, and thereby the electrical neutrality of the crystal is maintained. In the niobium-titanium oxide, not only are Ti ions reduced from tetravalence to trivalence, but also Nb ions are reduced from pentavalence to trivalence. Thus, the reducing valence per weight of the active material is large. Therefore, even if a large number of lithium ions are inserted, the electrical neutrality of the crystal can be maintained. Thus, the energy density is higher than that of a compound such as titanium oxide, which contains only tetravalent cations. In addition, the $Nb_2TiO_7$ phase is superior in weight energy density to a $Nb_{10}Ti_2O_{29}$ phase, a $Nb_{14}TiO_{37}$ phase, and a $Nb_{24}TiO_{64}$ phase described later. This is because the numbers of Nb atoms per mole contained in the $Nb_{10}Ti_2O_{29}$ phase, the $Nb_{14}TiO_{37}$ phase, and the $Nb_{24}TiO_{64}$ phase are large, that is, the weight per mole is large.

Next, the $Nb_{10}Ti_2O_{29}$ phase, the $Nb_{14}TiO_{37}$ phase, and the $Nb_{24}TiO_{64}$ phase are described. In the specification of the present application, these crystal phases may be collectively referred to as a Nb-rich phase. The Nb-rich phase means a niobium-titanium oxide phase in which the ratio of the amounts of substance of Nb/Ti is larger than 2.

The basic skeleton structure of the Nb-rich phase is a structure similar to the crystal structure of monoclinic $Nb_2TiO_7$ shown in FIGS. 1 and 2. If lithium ions are inserted into the void portion 104, metal ions 101 included in the skeleton are reduced to trivalence, and thereby the electrical neutrality of the crystal is maintained. The composition in a case where lithium ions are inserted into the $Nb_{10}Ti_2O_{29}$ phase can be represented by $Li_xNb_{10}Ti_2O_{29}$ ($0 \le x \le 22$). The composition in a case where lithium ions are inserted into the $Nb_{14}TiO_{37}$ phase can be represented by $Li_xNb_{14}TiO_{37}$ ($0 \le x \le 29$). The composition in a case where lithium ions are inserted into the $Nb_{24}TiO_{64}$ phase can be represented by $Li_xNb_{24}TiO_{64}$ ($0 \le x \le 49$).

In the $Nb_{10}Ti_2O_{29}$ phase, the $Nb_{14}TiO_{37}$ phase, and the $Nb_{24}TiO_{64}$ phase, which contain large amounts of niobium, the amount of Nb ions reduced from pentavalence to trivalence is larger than in the $Nb_2TiO_7$ phase. Thus, the reducing valence per mole of the active material is large. Therefore, even if a large number of lithium ions are inserted, the electrical neutrality of the crystal can be maintained. Therefore, at least one Nb-rich phase selected from the group consisting of the $Nb_{10}Ti_2O_{29}$ phase, the $Nb_{14}TiO_{37}$ phase, and the $Nb_{24}TiO_{64}$ phase can stably maintain the crystal structure even if lithium ions are excessively inserted as compared to the $Nb_2TiO_7$ phase.

The niobium-titanium oxide according to the embodiment may contain, for example, only the $Nb_2TiO_7$ phase, or may contain the $Nb_2TiO_7$ phase and a Nb-rich phase. From the viewpoint of weight energy density, as described above, the niobium-titanium oxide preferably contains the $Nb_2TiO_7$ phase as a main phase.

The niobium-titanium oxide can contain an element A as an element that is solid-dissolved without deficiency in the crystal lattice of the niobium-titanium oxide. The element A is at least one selected from the group consisting of Fe, Cr, W, and Mo. The element A is solid-dissolved without deficiency in the crystal lattice of the niobium-titanium oxide and without inhibiting the movement of Li ions. Therefore, the element A can narrow the band gap of the niobium-titanium oxide without adversely affecting the operation of the battery.

In a case where the niobium-titanium oxide contains Fe as an element A, there are effects of improving electron conductivity on the surface and enhancing rate characteristics.

In a case where the niobium-titanium oxide contains Cr as an element A, there are effects of improving electron conductivity on the surface and improving rate characteristics. Furthermore, since Cr is doped as $Cr^{3+}$, there is a valence change range from $Cr^{4+}$ to $Cr^{6+}$ at the time of extraction of $Li^+$ (at the time of discharging), and thus there are effects of promoting the movement of $Li^+$ and enhancing discharge rate characteristics.

In a case where the niobium-titanium oxide contains W as an element A, there are effects of improving electron conductivity on the surface and improving rate characteristics. Since W has a valence change range of hexavalence to trivalence, which is wider than trivalence to tetravalence of Ti and trivalence to pentavalence of Nb, there is an effect in which more Li can be inserted into more crystals.

In a case where the niobium-titanium oxide contains Mo as an element A, there are effects of improving electron conductivity on the surface and improving rate characteristics. Since Mo has a valence change range of hexavalence to trivalence, which is wider than trivalence to tetravalence of Ti and trivalence to pentavalence of Nb, there is an effect in which more Li can be inserted into more crystals. In addition, from a feature in which the melting point of the law material is low, there is an effect in which the firing temperature of the material can be lowered.

The element A can be contained in, for example, primary particles of the niobium-titanium oxide. The element A may be contained in some or all of a plurality of particles contained in a powder of the niobium-titanium oxide. In a case where the content of the element A in the niobium-titanium oxide particle is larger, L* tends to be smaller, a* tends to be larger, and b* tends to be smaller.

The primary particle containing the element A preferably has a gradient in which the amount of the element A increases from a center-of-gravity portion of the primary particle toward a surface layer.

Specifically, the primary particle may have a surface layer defined as a region having a depth of 20 nm from the surface of the primary particle and a center-of-gravity portion (bulk portion) present on the inside of the surface layer. The primary particle has a gradient in which the amount of the element A increases from the center-of-gravity portion toward the surface layer. In a case where the primary particle has such a concentration gradient, the structure of the crystal lattice forming the particle continuously changes. Therefore, during the movement of Li ions through the crystal lattice, the Li ions can smoothly move along a direction connecting the particle surface and the center of gravity of the particle.

The element A can be present not only in the surface layer but also in a minute amount in the bulk portion, and therefore electrons that have reached the particle interface from the outside of the particle can quickly move to the particle center.

Whether the primary particle contains the element A or not can be found by TEM-EDS (transmission electron microscope-energy dispersive X-ray spectroscopy) in which a transmission electron microscope and energy dispersive X-ray spectroscopy are combined. By TEM-EDS, also whether a continuous concentration gradient of the element A is present in the primary particle or not can be found. In each of the surface layer and the center-of-gravity portion described above, the content AA of the element A and the total amount AM of niobium atoms and titanium atoms can be measured.

<TEM-EDS Observation>

In transmission electron microscope observation, it is desirable that a target sample powder be embedded in a resin or the like and the inside of the test piece be cut out by mechanical polishing, ion milling, or the like. There is a case where a carbon coat for improving electron conductivity is provided on the particle surface of the target sample. In this case, the particle surface of a portion where the carbon coat is not provided is observed.

Similar processing can be performed even if the target sample is an electrode. For example, the electrode may be embedded in a resin as it is and a desired place may be observed, or a current collector (metal foil) may be peeled off from the electrode and the electrode may be observed as an electrode powder in which a conductive material and a binder coexist. Thereby, how two crystal phases are distributed in the primary particle can be found, and furthermore the gradient of the composition of the particle interior can be found. In addition, EDS can be used to measure the concentration distribution of the particle interior of a specific element.

A specific example will now be described with reference to FIG. 3. FIG. 3 is a plan view schematically showing a particle to be measured. First, the center of gravity of a particle to be measured is regarded as the center of the particle. Next, five measurement points are set at equal intervals on a straight line connecting the center of the particle and an arbitrary point on the particle surface. Examination is performed on multiple wave interference images of particle portions at three points in orthogonal regions on each measurement point, and electron beam diffraction patterns are observed. By this observation, the crystal structure included in the measurement point can be found. For example, the $Nb_2TiO_7$ phase, the $Nb_{10}Ti_2O_{29}$ phase, the $Nb_{14}TiO_{37}$ phase, the $Nb_{24}TiO_{64}$ phase, and other phases can be easily distinguished by simulating electron beam diffraction patterns.

In the surface layer above, a ratio AA/AM between a content AA of the element A and a total amount AM of niobium atoms and titanium atoms satisfies, for example, $0.02 \leq AA/AM \leq 0.10$. In a case where the ratio AA/AM satisfies this numerical range, a proper amount of the element A is contained on the particle surface, and therefore a reduction in capacity can be suppressed while electrons from the outside of the particle are efficiently taken into the particle.

In the center-of-gravity portion above, the ratio AA/AM between the content AA of the element A and the total amount AM of niobium atoms and titanium atoms satisfies $0.001 \leq AA/AM \leq 0.01$. The center-of-gravity portion has a larger volume than the surface layer. Therefore, by putting such a minute amount of the element A in the center-of-gravity portion, electron conductivity can be effectively enhanced while a reduction in battery voltage is suppressed.

In the primary particle, the region defined as the surface layer and the region defined as the center-of-gravity portion are merely formally or virtually divided with a depth of 20 nm as a reference. That is, it is not the case that a layer corresponding to the surface layer is adhered on the surface of the center-of-gravity portion. The surface layer and the center-of-gravity portion may have the same crystal phase, and may be a part and another part of a primary particle respectively.

The crystal lattice forming the niobium-titanium oxide contains oxygen atoms. Some of the oxygen atoms included in the crystal lattice may be missing. In a case where oxygen deficiency in the niobium-titanium oxide particle is larger, L* tends to be smaller, and a* tends to be smaller. b* tends to change in the positive direction in the case of a small amount of oxygen deficiency, and b* tends to change in the negative direction in a case where excessive oxygen deficiency is introduced.

The niobium-titanium oxide according to the embodiment has, for example, an oxygen deficiency in the range of 100 ppm to 10000 ppm. As an example, a primary particle of the niobium-titanium oxide may have an oxygen deficiency in the range of 100 ppm to 10000 ppm. In the specification and claims of the present application, the amount of oxygen deficiency is measured by the amount of increase in weight in the range of 200° C. to 500° C. in thermogravimetry (TG) in the air. That is, the amount of increase in weight in the above temperature range is regarded as the amount of oxygen deficiency.

In a case where the amount of oxygen deficiency is in the above range, a proper amount of oxygen deficiency is present on the particle surface, and therefore the band gap is not excessively narrowed. Therefore, a reduction in capacity can be suppressed while electrons from the outside of the particle are efficiently taken into the particle.

The primary particle preferably has a gradient in which the amount of the oxygen atoms decreases from a center-of-gravity portion of the primary particle toward a surface layer. In a case where the primary particle has a concentration gradient of oxygen deficiency, the structure of the crystal lattice forming the particle continuously changes. Therefore, during the movement of Li ions through the crystal lattice, the Li ions can smoothly move along a direction connecting the particle surface and the center of gravity of the particle. By putting a minute amount of the oxygen deficiency in the center-of-gravity portion, electron conductivity can be effectively enhanced while a reduction in battery voltage is suppressed.

In the surface layer above, a ratio AO/AM between a content AO of the oxygen atoms and a total amount AM of niobium atoms and titanium atoms can satisfy, for example, $2 \leq AO/AM \leq 2.3$. In a case where the ratio AO/AM satisfies $2 \leq AO/AM \leq 2.3$ for the entire primary particle including the surface layer, the amount of oxygen deficiency based on TG is more than 10000 ppm. If the amount of oxygen deficiency based on TG of the niobium-titanium oxide is in the range of 100 ppm to 10000 ppm and the ratio AO/AM satisfies $2 \leq AO/AM \leq 2.3$ in the surface layer of the primary particle, oxygen deficiency is present in the surface layer of the niobium-titanium oxide particle. Therefore, the primary particle has a gradient in which the amount of the oxygen atoms decreases from a center-of-gravity portion of the primary particle toward a surface layer. As a result, a reduction in capacity can be suppressed while electrons from the outside of the particle are efficiently taken into the particle. The ratio AO/AM can be measured by the TEM-EDS described above.

Nitrogen atoms may be added to the niobium-titanium oxide. The nitrogen atoms can be contained in, for example, primary particles of the niobium-titanium oxide. The nitrogen atoms may be contained in some or all of a plurality of particles contained in a powder of the niobium-titanium oxide. In a case where the content of nitrogen atoms in the niobium-titanium oxide particle is larger, L* tends to be smaller, a* tends to be larger, and b* tends to be larger.

The primary particle containing the nitrogen atoms preferably has a gradient in which the amount of the nitrogen atoms increases from a center-of-gravity portion of the primary particle toward a surface layer. In a case where the primary particle has a concentration gradient of such nitrogen atoms, the structure of the crystal lattice forming the particle continuously changes. Therefore, during the movement of Li ions through the crystal lattice, the Li ions can smoothly move along a direction connecting the particle surface and the center of gravity of the particle. The nitrogen atoms can be present not only in the surface layer but also in a minute amount in the bulk portion, and therefore electrons that have reached the particle interface from the outside of the particle can quickly move to the particle center.

In the surface layer above, a ratio AN/AM between a content AN of the nitrogen atoms and a total amount AM of niobium atoms and titanium atoms satisfies, for example, $0.01 \leq AN/AM \leq 0.3$. In a case where the ratio AN/AM satisfies this numerical range, a proper amount of nitrogen atoms is present on the particle surface, and therefore the band gap is not excessively narrowed. Therefore, a reduction in capacity can be suppressed while electrons from the outside of the particle are efficiently taken into the particle.

In the center-of-gravity portion above, a ratio AN/AM between a content AN of the nitrogen atoms and a total amount AM of niobium atoms and titanium atoms satisfies $0.0001 \leq AN/AM \leq 0.001$. The center-of-gravity portion has a larger volume than the surface layer. Therefore, by putting a minute amount of the nitrogen atoms in the center-of-gravity portion, electron conductivity can be effectively enhanced while a reduction in battery voltage is suppressed.

Whether the primary particle contains nitrogen atoms or not and the ratio AN/AM in each of the surface layer and the center-of-gravity portion can be measured by the TEM-EDS measurement.

The niobium-titanium oxide is preferably subjected to at least one treatment of the addition of the element A, oxygen deficiency, and nitrogen addition described above; in any case, the color of the niobium-titanium oxide is adjusted to satisfy all of Formulae (1) to (3) above.

The primary particle of the niobium-titanium oxide according to the embodiment preferably does not contain an amorphous phase. For example, an amorphous phase may be present in the range of 0 nm to 2 nm (including 0 nm) in the surface layer of the primary particle. The amorphous phase is poor in electron conductivity; hence, in a case where the primary particle contains small amounts of amorphous phases as above, not only excellent electron conductivity but also high battery capacity can be achieved. Whether the niobium-titanium oxide contains an amorphous phase or not can be found by the TEM observation described above.

The amorphous phase tends to have more hydroxyl groups on the surface than crystalline phases. Therefore, undesirable moisture adsorption tends to easily occur in the amorphous phase. Moisture adsorbed by hydrogen bonding to the hydroxyl group is difficult to remove. If the niobium-titanium oxide is subjected to charging and discharging, moisture not removed even by drying causes a side reaction with an electrolyte or the like, and contributes to gas generation. Conversely, by using the niobium-titanium oxide according to the embodiment in which the generation of an amorphous phase is suppressed, such moisture is hardly present on the particle surface. Therefore, gas generation can be suppressed.

The amount of moisture adsorbed on the niobium-titanium oxide surface is measured by the Karl Fischer method. For the niobium-titanium oxide according to the embodiment, an amount of adsorbed moisture analyzed by a Karl Fischer method is preferably 800 ppm or less. Herein, as the Karl Fischer method, the amount of moisture is measured by a coulometric titration method using a Karl Fischer moisture meter (Model VA-06, manufactured by Mitsubishi Chemical Analytech Co., Ltd.). Specifically, the measurement is performed under conditions where a sample is heated to 140° C. and nitrogen gas is passed in at a flow rate of 200 ml/min. The amount of moisture is found by conversion from the amount of electricity consumed in the reaction between water and iodine.

Examples of the niobium-titanium oxide having the monoclinic $Nb_2TiO_7$ phase include a compound having an average composition represented by $Li_xTi_{1-y}M1_yNb_{2-z}M2_zO_{7+\delta}$. Here, the M1 is at least one selected from the group consisting of Zr, Si, and Sn. The M2 is at least one selected from the group consisting of V, Ta, and Bi. The subscripts in the composition formula satisfy $0 \leq x \leq 5$, $0 \leq y < 1$, $0 \leq z < 2$, and $-0.3 \leq \delta \leq 0.3$. Specific examples of the monoclinic niobium-titanium oxide include $Li_xNb_2TiO_7$ ($0 \leq x \leq 5$).

Another example of the niobium-titanium oxide having the monoclinic $Nb_2TiO_7$ phase include a compound having an average composition represented by $Li_xTi_{1-y}M3_{y+z}Nb_{2-z}O_{7-\delta}$. Here, the M3 is at least one selected from the group consisting of Mg, Fe, Ni, Co, W, Ta, and Mo. The subscripts in the composition formula satisfy $0 \leq x \leq 5$, $0 \leq y < 1$, $0 \leq z < 2$, and $-0.3 \leq \delta \leq 0.3$.

<Measurement of L*a*b* Color Space>

For measurement of the L*a*b* color space based on Japanese Industrial Standard JIS Z 8722:2009 for the niobium-titanium oxide, a spectrophotometer based on a spectrophotometric colorimetry method in which reflectance is measured with each of wavelengths in the entire visible light region and tristimulus values are calculated can be used. At the time of measurement, the niobium-titanium oxide is taken as an object to be measured. At the time of measurement, for example, particles or a powder of the niobium-titanium oxide may be sandwiched between transparent films and measured. In a case where the niobium-titanium oxide is incorporated in an electrode mixture layer, the niobium-titanium oxide is isolated by the following method.

First, the battery is brought into a completely discharged state. The battery can be brought into a discharged state by discharging the battery to the rated cut off voltage at a 0.1 C current in a 25° C. environment.

Next, the battery is disassembled in a glove box filled with argon, and an electrode body (or an electrode group) is taken out. The electrode body is cleaned with an appropriate solvent, and is dried under reduced pressure at 60° C. for 12 hours. As the cleaning solvent, for example, ethyl methyl carbonate or the like can be used. Thus, the organic electrolyte contained in the electrode body can be removed. Next, the electrode is cut to obtain two electrode pieces. One of the cut electrode pieces is immersed in a solvent (an organic solvent such as alcohol or NMP is preferable), and ultrasonic waves are applied. Thereby, the current collector and the electrode constituent material included in the electrode body can be separated from each other. Next, a dispersion solvent in which the electrode constituent material is dispersed is subjected to a centrifugal separator to separate active material particles (for example, the niobium-titanium oxide powder) from the powder of the electrode body containing a conductive agent such as carbon.

<Powder X-ray Diffraction Measurement>

Powder X-ray diffraction measurement for the niobium-titanium oxide can be performed as follows, for example.

First, a target sample is pulverized until the average particle size reaches about 5 μm. The pulverized sample is put in a holder portion having a depth of 0.2 mm formed on a glass sample plate. At this time, attention should be given so that the sample is sufficiently put in the holder portion. In addition, care should be taken to put in a proper amount of the sample so as not to cause cracks, voids, or the like. Next, another glass plate is pressed from the outside to flatten the surface of the sample put in the holder portion. Care should be taken not to cause unevenness from a reference plane of the holder due to an excessive or insufficient filling amount.

Next, the glass plate filled with the sample is placed in a powder X-ray diffractometer, and a diffraction pattern (XRD pattern, X-ray diffraction pattern) is acquired using a Cu-Kα line.

The orientation of particles may be large depending on the particle shape of the sample. In a case where the orientation of the sample is high, the position of the peak may be shifted or the intensity ratio may be changed depending on how the sample is put in. Such a sample having a significantly high orientation is measured using a glass capillary. Specifically, a sample is inserted into a capillary, and the capillary is placed on a rotary sample stage and measurement is performed. By such a measurement method, the orientation can be relaxed. As the glass capillary, a Lindemann glass capillary having a diameter of 1 mm to 6 mm is preferably used.

In a case where powder X-ray diffraction measurement is performed on a niobium-titanium oxide as an active material contained in an electrode, the measurement can be performed as follows, for example.

First, in order to grasp the crystal state of the active material, a state where lithium ions are completely separated from the active material is created. For example, in a case where the active material is used in a negative electrode, the battery is brought into a completely discharged state. For example, a process in which the battery is discharged at a 0.1 C current in a 25° C. environment up to the rated cut off voltage or until the battery voltage reaches 1.0 V is repeated multiple times so that the current value at the time of discharging is $\frac{1}{100}$ or less of the rated capacity; thus, the battery can be brought into a discharged state. Residual lithium ions may be present even in the discharged state.

Next, the battery is disassembled in a glove box filled with argon, and the electrode is taken out and cleaned with an appropriate solvent. As the appropriate solvent, for example, ethyl methyl carbonate can be used. If the cleaning of the electrode is insufficient, an impurity phase such as lithium carbonate or lithium fluoride may get mixed due to the influence of lithium ions remaining in the electrode. In that case, it is preferable to use an airtight container that allows measurement to be performed in a measurement atmosphere of an inert gas. The cleaned electrode is cut to have an area almost equal to the area of the holder of the powder X-ray diffractometer; thus, a measurement sample is obtained. This sample is directly attached to a glass holder, and measurement is performed.

At this time, peaks derived from metal foil as a current collector, a conductive agent, a binder, etc. are measured and grasped in advance using XRD. As a matter of course, if these have been successfully grasped in advance, this operation can be omitted. In a case where the peak of the current collector and the peak of the active material overlap, it is desirable that the active material-containing layer be peeled off from the current collector and measured. This is in order to separate an overlapping peak at the time of quantitative measurement of peak intensity. Although the active material-containing layer may be physically peeled off, it is easily peeled off if ultrasonic waves are applied in a solvent. In a case where ultrasonic treatment is performed to peel off the active material-containing layer from the current collector, the electrode body powder (containing the active material, the conductive agent, and the binder) can be taken by volatilizing the solvent. Powder X-ray diffraction measurement of the active material can be performed by putting the electrode body powder in, for example, a Lindemann glass capillary or the like and performing measurement. The electrode body powder taken by ultrasonic treatment can also be subjected to various analyses other than powder X-ray diffraction measurement.

As an apparatus for powder X-ray diffraction measurement, for example, SmartLab manufactured by Rigaku Corporation is used. The measurement conditions are as follows:

X-ray source: a Cu target

Power: 45 kV 200 mA

Soller slits: 5° for both incidence and light reception

Step range (2θ): 0.02 deg

Scan speed: 20 deg/min

Semiconductor detector: D/teX Ultra 250

Measurement range: 5°≤2θ≤90°

Sample plate holder: a flat glass sample plate holder (thickness: 0.5 mm).

In the case of using another apparatus, in order to obtain a measurement result equivalent to the above, measurement using a standard Si powder for powder X-ray diffraction is performed, and measurement is performed while the peak intensity and the peak top position are adjusted to conditions that match those of the above apparatus.

<ICP Emission Spectroscopy>

The composition of the niobium-titanium oxide can be analyzed using, for example, inductively coupled plasma (ICP) emission spectroscopy. At this time, the abundance ratio (molar ratio) of each element depends on the sensitivity of the analyzer to be used. Therefore, the numerical value of the measured molar ratio may deviate from the actual molar ratio by an error of the measuring apparatus. However, even if the numerical value deviates in the error range of the analyzer, the performance of the niobium-titanium oxide according to the embodiment can be sufficiently exhibited.

To measure the composition of the active material incorporated in the battery by ICP emission spectroscopy, specifically, the following procedure is performed.

First, according to the procedure described in the section of powder X-ray diffraction measurement, an electrode containing an active material to be measured is taken out from the secondary battery and cleaned. A portion containing the electrode active material, such as an active material-containing layer, is peeled off from the cleaned electrode. For example, the portion containing the electrode active material can be peeled off by irradiation with ultrasonic waves. As a specific example, for example, the active material-containing layer containing the electrode active material can be peeled off from the electrode current collector by placing the electrode in ethyl methyl carbonate put in a glass beaker and performing vibration in an ultrasonic cleaner.

Next, the peeled-off portion is heated in the air for a short time (for example, at 500° C. for about 1 hour) to burn off unnecessary components such as a binder component and carbon. By dissolving this residue with acid, a liquid sample containing the active material can be prepared. At this time, hydrochloric acid, nitric acid, sulfuric acid, hydrofluoric acid, or the like can be used as the acid. By subjecting this liquid sample to ICP analysis, the average composition in the active material can be found.

<Thermogravimetric Analysis>

A niobium-titanium oxide powder is isolated by the method described in the section of measurement of the L*a*b* color space described above. At the time of thermogravimetry, the temperature of the obtained powder, which is an object to be measured, is raised from room temperature to 500° C. under the condition of 5° C./min, and the weight increase is measured. In the case of measuring the amount of oxygen deficiency, the amount of increase in weight in the range of 200° C. to 500° C. is measured.

<Measurement of Particle Size Distribution of Active Material Particles by Laser Diffraction Scattering Method>

A niobium-titanium oxide powder is isolated by the method described in the section of measurement of the L*a*b* color space described above. The obtained powder is dispersed in a N-methyl-2-pyrrolidone (NMP) solvent, and ultrasonic treatment is performed to obtain a dispersion solution as a sample for particle size distribution measurement. The dispersion solution is subjected to particle size distribution measurement using a laser diffraction distribution measuring apparatus. As the measuring apparatus, for example, Microtrac MT 3100 II manufactured by Microtrac-BEL Corporation can be used.

The ultrasonic treatment for preparing the dispersion solvent is performed by a sample supply system attached to the laser diffraction distribution measuring apparatus. The ultrasonic treatment is performed at a power of 40 W for 300 seconds, for example.

<Method for Producing Niobium-Titanium Oxide>

The niobium-titanium oxide according to the embodiment can be produced by, for example, a synthesis method described below.

First, starting materials are mixed. As a starting material containing niobium and titanium, an oxide or a salt containing Nb and Ti is prepared. For example, $Nb_2O_5$ particles and $TiO_2$ particles can be used as starting materials. In the case of incorporating an element A in the niobium-titanium oxide finally obtained, a desired element A is incorporated into a Ti source used as a law material.

Alternatively, in a case where it is intended to bring about oxygen deficiency or incorporate nitrogen atoms in the niobium-titanium oxide, the firing atmosphere at the time of firing after mixing the Nb source and the Ti source is changed from the air atmosphere to another atmosphere. In the case of bringing about oxygen deficiency, for example, it is effective to lower the oxygen partial pressure and/or raise the firing temperature. In the case of adding nitrogen atoms, for example, it is effective to perform firing with a lowered oxygen partial pressure and in a normal-pressure nitrogen atmosphere. Alternatively, the nitrogen partial pressure may be raised.

In the case of producing a niobium-titanium oxide containing an element A and having oxygen deficiency and/or nitrogen addition, the operations described above may be performed in combination, as appropriate.

In solid phase synthesis, first, a Ti source and a source powder containing an element A are mixed, and the mixture is subjected to pulverization and calcination. The pulverization and calcination can be performed by, for example, performing mixing and pulverization in a ball mill for 0.5 hours to 12 hours and then performing firing at a temperature of 600° C. to 1000° C. for 1 hour to 12 hours. As a source material of the element A, for example, an oxide containing at least one selected from the group consisting of Fe, Cr, W, and Mo as the element A can be used. Examples of such a source material include $Fe_2O_3$, $Cr_2O_3$, $MoO_3$, $WO_3$, and the like.

The mixing amount of the element A can be changed according to the target color of the surface of the niobium-titanium oxide, as appropriate; for example, it is set to such an amount that the concentration of the element A is 500 ppm to 10000 ppm with respect to $TiO_2$, which can be a source material. In the case of using source materials having relatively low boiling points, such as $MoO_3$ and $WO_3$, in view of the influence of volatilization of these source materials, the put-in amount may be set excessive so that the concentration of the element A in the niobium-titanium oxide finally obtained is the target concentration.

Thus, a Ti source containing the element A can be obtained. The element A is, for example, solid-dissolved in the Ti source.

The average particle size of the Ti source powder containing the element A is preferably set smaller than the average particle size of the Nb source powder. Here, the average particle size may be a median diameter (D50). By setting the average particle size of the Ti source smaller than that of the Nb source, the Ti source particles first diffuse into the particles as the Nb source at the time of solid phase diffusion, and a thermally stable $TiNb_2O_7$ phase is generated. Next, the element A diffuses into the particle with a delay. Thus, a niobium-titanium oxide that has a $TiNb_2O_7$ phase on the inside (in the center-of-gravity portion) and in which the element A is unevenly distributed in the surface layer portion can be produced. It is not the case that the element A is absent in the center-of-gravity portion. For example, the element A is present in the primary particle in such a way as to have a concentration gradient that increases from the center-of-gravity portion toward the surface layer.

The ratio D2/D1 of the average particle size D2 of the Nb source powder to the average particle size D1 of the Ti source powder containing the element A is, for example, set in the range of 5 to 20. By setting the average particle size D2 of the Nb source powder larger than the average particle size D1 of the Ti source powder, the generation of $TiO_2$ can be hindered in the particles. Since $TiO_2$ is an insulator, the amount of $TiO_2$ contained in the niobium-titanium oxide generated is desirably smaller. The average particle size D1 of the Ti source powder containing the element A is, for example, set in the range of 0.01 μm to 0.2 μm. The average particle size D2 of the Nb source powder is, for example, set in the range of 0.05 μm to 1 μm.

The mixing and firing of the Ti source powder and the Nb source powder can be performed by the following method, for example. As the Ti source powder, one containing the element A described above may be used, or one not containing the element A may be used. In the case of using a Ti source powder not containing the element A, the firing atmosphere is set to a reducing atmosphere or a nitrogen atmosphere as described later.

After these source materials are mixed, the resulting mixture is pulverized to obtain a mixture that is as uniform as possible. Next, the obtained mixture is subjected to firing. The firing is performed at a temperature of 800° C. to 1200° C. or less for 1 hour to 10 hours. In the case of bringing about oxygen deficiency in the niobium-titanium oxide, the oxygen partial pressure of the firing atmosphere may be set to, for example, 200 Pa or less, and may be set to 20 Pa to 100 Pa. In the case of performing nitrogen addition treatment, for example, the oxygen partial pressure in the firing atmosphere is, for example, set in the range of 0.1 Pa to 20 Pa, and the nitrogen partial pressure is set to normal pressure.

The niobium-titanium oxide obtained after full firing may be pulverized as appropriate. However, in order to crystallize the amorphous phase generated on the surface by pulverization, it is preferable that, after pulverization, crystallization treatment be performed at a temperature of 600 to 900° C. or less. By this process, an NTO having the claimed hue can be synthesized. The firing time is preferably 18 hours or less, and it is more preferable that slow cooling be performed without firing time after temperature raising.

The niobium-titanium oxide synthesized by the above method can be used as an active material to be incorporated into a secondary battery. In this case, lithium ions may be inserted by performing charging after the battery is assembled.

According to a first embodiment, a niobium-titanium oxide is provided. The niobium-titanium oxide satisfies Formulae (1) to (3) below in the L*a*b* color space measured based on Japanese Industrial Standard JIS Z 8722:2009.

$$95.0 \leq L^* \leq 100.0 \tag{1}$$

$$-1.0 \leq a^* \leq 1.0 \tag{2}$$

$$-1.0 \leq b^* \leq 6.0 \tag{3}.$$

The niobium-titanium oxide according to the embodiment can provide a secondary battery having high capacity and excellent rate characteristics for the reasons described above.

Second Embodiment

According to a second embodiment, an active material containing the niobium-titanium oxide according to the embodiment is provided. The niobium-titanium oxide according to the first embodiment can function as an active material for a secondary battery. The active material may be a negative electrode active material, or may be a positive electrode active material.

The active material can contain the niobium-titanium oxide according to the first embodiment in various particle forms described above. The active material may contain only one kind of niobium-titanium oxide according to the first embodiment, or may contain two or more kinds of niobium-titanium oxide according to the first embodiment. The active material may contain one kind or two or more kinds of niobium-titanium oxide according to the first embodiment and one kind or two or more kinds of other active materials.

The weight proportion of the niobium-titanium oxide according to the first embodiment contained in the active material according to the second embodiment is preferably 50 wt % or more.

In a case where the active material according to the second embodiment is a negative electrode active material, examples of other active materials include lithium titanate having a ramsdellite structure (for example, $Li_{2+y}Ti_3O_7$, $0 \le y \le 3$), lithium titanate having a spinel structure (for example, $Li_{4+x}Ti_5O_{12}$, $0 \le x \le 3$), titanium dioxide ($TiO_2$), anatase-type titanium dioxide, rutile-type titanium dioxide, niobium pentoxide ($Nb_2O_5$), a hollandite-type titanium composite oxide, an orthorhombic titanium composite oxide, and a monoclinic niobium-titanium oxide.

Examples of the orthorhombic titanium-containing composite oxide include a compound represented by $Li_{2+a}M1_{2-b}Ti_{6-c}M2_dO_{14+\sigma}$. Here, the M1 is at least one selected from the group consisting of Sr, Ba, Ca, Mg, Na, Cs, Rb, and K. The M2 is at least one selected from the group consisting of Zr, Sn, V, Nb, Ta, Mo, W, Y, Fe, Co, Cr, Mn, Ni, and Al. The subscripts in the composition formula satisfy $0 \le a \le 6$, $0 \le b < 2$, $0 \le c < 6$, $0 \le d < 6$, and $-0.5 \le \sigma < 0.5$. Specific examples of the orthorhombic titanium-containing composite oxide include $Li_{2+a}Na_2Ti_6O_{14}$ ($0 \le a \le 6$).

The primary particle of the niobium-titanium oxide may have a carbon-containing layer on the particle surfaces of the primary particle. The carbon-containing layer may be adhered to the surface of the primary particle, or may be adhered to the surface of the secondary particle. Alternatively, the active material particles may include a secondary particle in which primary particles each having a carbon-containing layer adhered to the surface are aggregated. Such a secondary particle can exhibit excellent conductivity because carbon exists between primary particles. An aspect containing such a secondary particle is preferable because the active material-containing layer can exhibit lower resistance.

The particle size and the specific surface area of the active material according to the embodiment will now be described.

<Particle Size>

The average particle size of an active material particle that is a primary particle or a secondary particle of the niobium-titanium oxide is not particularly limited. The average particle size of the active material particle is, for example, in the range of 0.1 μm to 50 μm. The average particle size can be varied according to required battery characteristics. For example, in order to enhance rapid charge-discharge performance, the average particle size is preferably set to 1.0 μm or less. Thereby, the diffusion distance of lithium ions in the crystal can be reduced, and therefore rapid charge-discharge performance can be enhanced. The average particle size can be determined by, for example, a laser diffraction method.

<BET Specific Surface Area>

The BET (Brunauer, Emmett, Teller) specific surface area of the active material according to the embodiment is not particularly limited. However, the BET specific surface area is preferably 5 $m^2/g$ or more and less than 200 $m^2/g$.

If the specific surface area is 5 $m^2/g$ or more, a contact area with the electrolyte can be secured, and good discharge rate characteristics can be easily obtained and the charging time can be shortened. On the other hand, if the specific surface area is less than 200 $m^2/g$, the reactivity with the electrolyte is not excessively increased, and life characteristics can be improved. In addition, the coatability of a slurry containing an active material used for the manufacturing of an electrode described later can be improved.

Here, the measurement of the specific surface area uses a method in which molecules for which the adsorption occupancy area per molecule is known are caused to adsorb on the surface of the powder particle at a temperature of liquid nitrogen and the amount of molecules is used to determine the specific surface area of the sample. The method most often used is the BET method based on low temperature-low humidity physical adsorption of an inert gas, and the BET method is the most famous theory as a method for calculating a specific surface area, in which the Langmuir theory, which is a monolayer adsorption theory, is extended to multilayer adsorption. The specific surface area thus determined is referred to as a BET specific surface area.

According to the second embodiment, an active material is provided. This active material contains the niobium-titanium oxide according to the first embodiment. Therefore, this active material can provide a secondary battery having high capacity and excellent rate characteristics.

Third Embodiment

According to a third embodiment, an electrode is provided.

The electrode according to the third embodiment contains the active material according to the second embodiment. The electrode may be a battery electrode containing the active material according to the second embodiment as a battery active material. The electrode as a battery electrode may be, for example, a negative electrode containing the active material according to the second embodiment as a negative electrode active material.

The electrode according to the third embodiment may include a current collector and an active material-containing layer. The active material-containing layer can be formed on one surface or both surfaces of the current collector. The active material-containing layer can contain the active material according to the second embodiment, and optionally a conductive agent and a binder. The active material according to the second embodiment may contain one kind or two or more kinds of niobium-titanium oxide according to the first embodiment and one kind or two or more kinds of other active materials, as described above.

The conductive agent is blended in order to enhance current collection performance and to suppress the contact resistance between the active material and the current collector. Examples of the conductive agent include carbonaceous materials such as vapor grown carbon fiber (VGCF), carbon black such as acetylene black, graphite, carbon nanotubes, and carbon nanofibers. One of these may be used as a conductive agent, or two or more of these may be used in combination as a conductive agent. Alternatively, instead of using the conductive agent, a carbon coat or an electron conductive inorganic material coat may be applied to the surface of the active material particle.

The binder is blended in order to fill gaps of the dispersed active material and to bind the active material and the current collector. Examples of the binder include polytetrafluoroethylene (PTFE), polyvinylidene fluoride (PVdF), fluorine-based rubber, styrene-butadiene rubber, polyacrylic acid compounds, imide compounds, carboxymethyl cellulose (CMC), and salts of CMC. One of these may be used as a binder, or two or more of these may be used in combination as a binder.

The blending proportion of the active material, the conductive agent, and the binder in the active material-containing layer can be changed according to the use of the electrode, as appropriate. For example, in a case where the electrode is used as a negative electrode of a secondary battery, it is preferable that the active material (negative electrode active material), the conductive agent, and the binder be blended in proportions of 68 mass % or more and 96 mass % or less, 2 mass % or more and 30 mass % or less, and 2 mass % or more and 30 mass % or less, respectively. By setting the amount of the conductive agent to 2 mass % or more, the current collection performance of the active material-containing layer can be improved. In addition, by setting the amount of the binder to 2 mass % or more, the binding properties between the active material-containing layer and the current collector become sufficient, and excellent cycle performance can be expected. On the other hand, each of the amounts of the conductive agent and the binder is preferably set to 30 mass % or less in order to increase the capacity.

For the current collector, a material that is electrochemically stable at a potential at which lithium (Li) is inserted into and extracted from the active material is used. For example, in a case where the active material is used as a negative electrode active material, the current collector is preferably made by using copper, nickel, stainless steel, or aluminum, or an aluminum alloy containing one or more elements selected from Mg, Ti, Zn, Mn, Fe, Cu, and Si. The thickness of the current collector is preferably 5 μm or more and 20 μm or less. The current collector having such a thickness can balance the strength and weight reduction of the electrode.

The current collector may include, on its surface, a portion where a negative electrode active material-containing layer is not formed. This portion can act as a negative electrode tab.

The electrode can be produced by the following method, for example. First, an active material, a conductive agent, and a binder are suspended in a solvent to prepare a slurry. The slurry is applied to one surface or both surfaces of a current collector. Next, the applied slurry is dried to obtain a stacked body of an active material-containing layer and the current collector. After that, the stacked body is subjected to pressing. In this way, an electrode is produced.

Alternatively, the electrode may be produced by the following method. First, an active material, a conductive agent, and a binder are mixed to obtain a mixture. Next, the mixture is formed into a pellet form. Next, these pellets are placed on a current collector; thus, an electrode can be obtained.

The electrode according to the third embodiment contains the active material according to the second embodiment. Therefore, this electrode can provide a secondary battery having high capacity and excellent rate characteristics.

Fourth Embodiment

According to a fourth embodiment, a secondary battery including a negative electrode, a positive electrode, and an electrolyte is provided. The secondary battery includes the electrode according to the third embodiment as the negative electrode. That is, the secondary battery according to the fourth embodiment includes, as the negative electrode, an electrode containing the active material according to the second embodiment as a battery active material.

The secondary battery according to the fourth embodiment may further include a separator provided between the positive electrode and the negative electrode. The negative electrode, the positive electrode, and the separator can constitute an electrode group. The electrolyte can be retained in the electrode group.

The secondary battery may further include a container member that houses the electrode group and the electrolyte.

The secondary battery may further include a negative electrode terminal electrically connected to the negative electrode and a positive electrode terminal electrically connected to the positive electrode.

The secondary battery may be, for example, a lithium secondary battery. The secondary battery includes a non-aqueous electrolyte secondary battery containing a nonaqueous electrolyte.

Hereinbelow, the negative electrode, the positive electrode, the electrolyte, the separator, the container member, the negative electrode terminal, and the positive electrode terminal are described in detail.

1) Negative Electrode

The negative electrode may include a negative electrode current collector and a negative electrode active material-containing layer. The negative electrode current collector and the negative electrode active material-containing layer may be a current collector and an active material-containing layer that can be included in the electrode according to the third embodiment, respectively. The negative electrode active material-containing layer contains the active material according to the second embodiment as a negative electrode active material.

Among the details of the negative electrode, portions overlapping with the details described in the third embodiment are omitted.

The density of the negative electrode active material-containing layer (not including the current collector) is preferably 1.8 g/cm$^3$ or more and 2.8 g/cm$^3$ or less. The negative electrode in which the density of the negative electrode active material-containing layer is in this range is excellent in energy density and electrolyte retention properties. The density of the negative electrode active material-containing layer is more preferably 2.1 g/cm$^3$ or more and 2.6 g/cm$^3$ or less.

The negative electrode can be produced, for example, by the same method as the electrode according to the third embodiment.

2) Positive Electrode

The positive electrode may include a positive electrode current collector and a positive electrode active material-containing layer. The positive electrode active material-containing layer can be formed on one surface or both surfaces of the positive electrode current collector. The positive electrode active material-containing layer can contain the positive electrode active material, and optionally a conductive agent and a binder.

As the positive electrode active material, for example, an oxide or a sulfide can be used. The positive electrode may contain, as the positive electrode active material, one kind of compound alone or two or more kinds of compounds in combination. Examples of the oxide and the sulfide include compounds that Li or Li ions can be inserted into and extracted from.

Examples of such compounds include manganese dioxide ($MnO_2$), iron oxide, copper oxide, nickel oxide, and a lithium-manganese composite oxide (for example, $Li_xMn_2O_4$ or $Li_xMnO_2$; $0<x\le1$), a lithium-nickel composite oxide (for example, $Li_xNiO_2$; $0<x\le1$), a lithium-cobalt composite oxide (for example, $Li_xCoO_2$; $0<x\le1$), a lithium-nickel-cobalt composite oxide (for example, $Li_xNi_{1-y}Co_yO_2$; $0<x\le1$, $0<y<1$), a lithium-manganese-cobalt composite oxide (for example, $Li_xMn_yCo_{1-y}O_2$; $0<x\le1$, $0<y<1$), a lithium-manganese-nickel composite oxide having a spinel structure (for example, $Li_xMn_{2-y}Ni_yO_4$; $0<x\le1$, $0<y\le2$), a lithium phosphate having an olivine structure (for example, $Li_xFePO_4$; $0<x\leq1$, $Li_xFe_{1-y}Mn_yPO_4$; $0<x\leq1$, $0<y\leq1$, $Li_xCoPO_4$; $0<x\leq1$), iron sulfate ($Fe_2$ ($SO_4$)$_3$), a vanadium oxide (for example, $V_2O_5$), and a lithium-nickel-cobalt-manganese composite oxide ($Li_xNi_{1-y-z}Co_yMn_zO_2$; $0<x\leq1$, $0<y<1$, $0<z<1$, $y+z<1$).

Among the above, examples of compounds more preferable as the positive electrode active material include a lithium-manganese composite oxide having a spinel structure (for example, $Li_xMn_2O_4$; $0<x\leq1$), a lithium-nickel composite oxide (for example, $Li_xNiO_2$; $0<x\leq1$), a lithium-cobalt composite oxide (for example, $Li_xCoO_2$; $0<x\leq1$), a lithium-nickel-cobalt composite oxide (for example, $Li_xNi_{1-y}$ $Co_yO_2$; $0<x\leq1$, $0<y<1$), a lithium-manganese-nickel composite oxide having a spinel structure (for example, $Li_xMn_{2-y}Ni_yO_4$; $0<x\leq1$, $0<y<2$), a lithium-manganese-cobalt composite oxide (for example, $Li_xMn_yCo_{1-y}O_2$; $0<x\leq1$, $0<y<1$), lithium iron phosphate (for example, $Li_xFePO_4$; $0<x\leq1$), and a lithium-nickel-cobalt-manganese composite oxide ($Li_xNi_{1-y-z}Co_yMn_zO_2$; $0<x\leq1$, $0<y<1$, $0<z<1$, $y+z<1$). If these compounds are used for the positive electrode active material, the positive electrode potential can be raised.

In a case where a room-temperature molten salt is used as the electrolyte of the battery, it is preferable to use a positive electrode active material containing lithium iron phosphate, $Li_xVPO_4F$ ($0\leq x\leq1$), a lithium-manganese composite oxide, a lithium-nickel composite oxide, a lithium-nickel-cobalt composite oxide, or a mixture of these. These compounds have low reactivity with room-temperature molten salts, and therefore can improve the cycle life. Details of the room-temperature molten salt will be described later.

The primary particle size of the positive electrode active material is preferably 100 nm or more and 1 μm or less. The positive electrode active material having a primary particle size of 100 nm or more is easy to handle in industrial production. The positive electrode active material having a primary particle size of 1 μm or less can smoothly advance in-solid diffusion of lithium ions.

The specific surface area of the positive electrode active material is preferably 0.1 m²/g or more and 10 m²/g or less. The positive electrode active material having a specific surface area of 0.1 m²/g or more can sufficiently secure sites of Li ion insertion/extraction. The positive electrode active material having a specific surface area of 10 m²/g or less is easy to handle in industrial production, and can ensure good charge-and-discharge cycle performance.

The binder is blended in order to fill gaps of the dispersed positive electrode active material and to bind the positive electrode active material and the positive electrode current collector. Examples of the binder include polytetrafluoroethylene (PTFE), polyvinylidene fluoride (PVdF), fluorine-based rubber, polyacrylic acid compounds, imide compounds, carboxymethyl cellulose (CMC), and salts of CMC. One of these may be used as a binder, or two or more of these may be used in combination as a binder.

The conductive agent is blended in order to enhance current collection performance and to suppress the contact resistance between the positive electrode active material and the positive electrode current collector. Examples of the conductive agent include carbonaceous materials such as vapor grown carbon fiber (VGCF), carbon black such as acetylene black, and graphite. One of these may be used as a conductive agent, or two or more of these may be used in combination as a conductive agent. Further, the conductive agent can be omitted.

In the positive electrode active material-containing layer, the positive electrode active material and the binder are preferably blended in proportions of 80 mass % or more and 98 mass % or less and 2 mass % or more and 20 mass % or less, respectively.

By setting the amount of the binder to 2 mass % or more, sufficient electrode strength can be obtained. In addition, the binder can function as an insulator. Therefore, if the amount of the binder is set to 20 mass % or less, the amount of the insulator contained in the electrode is reduced, and therefore the internal resistance can be reduced.

In the case of adding a conductive agent, the positive electrode active material, the binder, and the conductive agent are preferably blended in proportions of 77 mass % or more and 95 mass % or less, 2 mass % or more and 20 mass % or less, and 3 mass % or more and 15 mass % or less, respectively.

By setting the amount of the conductive agent to 3 mass % or more, the effect described above can be exhibited. In addition, by setting the amount of the conductive agent to 15 mass % or less, the proportion of the conductive agent in contact with the electrolyte can be reduced. If this proportion is low, decomposition of the electrolyte can be reduced under high temperature storage.

The positive electrode current collector is preferably aluminum foil or aluminum alloy foil containing one or more elements selected from Mg, Ti, Zn, Ni, Cr, Mn, Fe, Cu, and Si.

The thickness of the aluminum foil or the aluminum alloy foil is preferably 5 μm or more and 20 μm or less, and more preferably 15 μm or less. The purity of the aluminum foil is preferably 99 mass % or more. The content of transition metals such as iron, copper, nickel, and chromium contained in the aluminum foil or the aluminum alloy foil is preferably 1 mass % or less.

The positive electrode current collector may include, on its surface, a portion where a positive electrode active material-containing layer is not formed. This portion can act as a positive electrode tab.

The positive electrode can be produced, for example, using positive electrode active material, by the same method as the electrode according to the third embodiment.

3) Electrolyte

As the electrolyte, for example, a liquid nonaqueous electrolyte or a gel nonaqueous electrolyte can be used. The liquid nonaqueous electrolyte is prepared by dissolving an electrolyte salt as a solute in an organic solvent. The concentration of the electrolyte salt is preferably 0.5 mol/L or more and 2.5 mol/L or less.

Examples of the electrolyte salt include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$), and lithium bis(trifluoromethylsulfonyl)imide ($LiN(CF_3SO_2)_2$), and mixtures of these. The electrolyte salt is preferably hardly oxidized even at a high potential, and is most preferably $LiPF_6$.

Examples of the organic solvent include cyclic carbonates such as propylene carbonate (PC), ethylene carbonate (EC), and vinylene carbonate (VC); chain carbonates such as diethyl carbonate (DEC), dimethyl carbonate (DMC), and methyl ethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoxyethane (DEE); and γ-butyrolactone (GBL), acetonitrile (AN), and sulfolane (SL). These organic solvents can each be used alone or as a mixed solvent.

The gel nonaqueous electrolyte is prepared by compositing a liquid nonaqueous electrolyte and a polymer material.

Examples of the polymer material include polyvinylidene fluoride (PVdF), polyacrylonitrile (PAN), polyethylene oxide (PEO), and mixtures of these.

Alternatively, as the nonaqueous electrolyte, in addition to the liquid nonaqueous electrolyte and the gel nonaqueous electrolyte, a room-temperature molten salt (ionic melt) containing lithium ions, a polymer solid electrolyte, an inorganic solid electrolyte, and the like may be used.

The room-temperature molten salt (ionic melt) refers to a compound that can exist as a liquid at room-temperature (15° C. or more and 25° C. or less) among organic salts having combinations of organic cations and anions. The room-temperature molten salt includes a room-temperature molten salt that exists as a liquid on its own, a room-temperature molten salt that becomes a liquid by being mixed with an electrolyte salt, a room-temperature molten salt that becomes a liquid by being dissolved in an organic solvent, or mixtures of these. In general, the melting point of a room-temperature molten salt used for a secondary battery is 25° C. or less. The organic cation generally has a quaternary ammonium skeleton.

The polymer solid electrolyte is prepared by dissolving an electrolyte salt in a polymer material and solidifying the solution.

The inorganic solid electrolyte is a solid substance having Li ion conductivity. The term "having Li ion conductivity" herein means that a lithium ion conductivity of $1 \times 10^{-6}$ S/cm or more is exhibited at 25° C. Examples of the inorganic solid electrolyte include oxide-based solid electrolytes and sulfide-based solid electrolytes. Specific examples of the inorganic solid electrolyte are as follows.

As the oxide-based solid electrolyte, a lithium phosphate solid electrolyte having a NASICON (sodium (Na) super ionic conductor) structure and represented by the general formula $Li_{1+x}M\alpha_2(PO_4)_3$ is preferably used. Ma in the above general formula is, for example, one or more selected from the group consisting of titanium (Ti), germanium (Ge), strontium (Sr), zirconium (Zr), tin (Sn), aluminum (Al), and calcium (Ca). The subscript x is in the range of $0 \leq x \leq 2$.

Specific examples of the lithium phosphate solid electrolyte having a NASICON structure include a LATP compound represented by $Li_{1+x}Al_xTi_{2-x}(PO_4)_3$ and satisfying $0.1 \leq x \leq 0.5$; a compound represented by $Li_{1+x}Al_yM\beta_{2-y}(PO_4)_3$, where MB is one or more selected from the group consisting of Ti, Ge, Sr, Zr, Sn, and Ca, and $0 \leq x \leq 1$ and $0 \leq y \leq 1$; a compound represented by $Li_{1+x}Al_xGe_{2-x}(PO_4)_3$ and satisfying $0 \leq x \leq 2$; a compound represented by $Li_{1+x}Al_xZr_{2-x}(PO_4)_3$ and satisfying $0 \leq x \leq 2$; a compound represented by $Li_{1+x+y}Al_xM\gamma_{2-x}Si_yP_{3-y}O_{12}$, where My is one or more selected from the group consisting of Ti and Ge, and $0 < x \leq 2$ and $0 \leq y < 3$; and a compound represented by $Li_{1+2x}Zr_{1-x}Ca_x(PO_4)_3$ and satisfying $0 \leq x < 1$.

Examples of the oxide-based solid electrolyte include, in addition to the above lithium phosphate solid electrolyte, an amorphous LIPON compound represented by $Li_xPO_yN_z$ and satisfying $2.6 \leq x \leq 3.5$, $1.9 \leq y \leq 3.8$, and $0.1 \leq z \leq 1.3$ (for example, $Li_{2.9}PO_{3.3}N_{0.46}$); a compound represented by $La_{5+x}A_xLa_{3-x}M\delta_2O_{12}$ of a garnet structure, where A is one or more selected from the group consisting of Ca, Sr, and Ba, Mo is one or more selected from the group consisting of Nb and Ta, and $0 \leq x \leq 0.5$; a compound represented by $Li_3 M\delta_{2-x}L_2O_{12}$, where Mo is one or more selected from the group consisting of Nb and Ta, L may include Zr, and $0 \leq x \leq 0.5$; a compound represented by $Li_{7-3-x}Al_xLa_3Zr_3O_{12}$ and satisfying $0 \leq x \leq 0.5$; an LLZ compound represented by $Li_{5+x}La_3M\delta_{2-x}Zr_xO_{12}$, where Mo is one or more selected from the group consisting of Nb and Ta and satisfying $0 \leq x \leq 2$ (for example, $Li_7La_3Zr_2O_{12}$); and a compound having a perovskite structure, represented by $La_{2/3-x}Li_xTiO_3$, and satisfying $0.3 \times 0.7$.

One or more of the above compounds can be used as a solid electrolyte. Two or more of the above solid electrolytes may be used.

4) Separator

The separator is formed by using, for example, a porous film containing polyethylene (PE), polypropylene (PP), cellulose, or polyvinylidene fluoride (PVdF), or a synthetic resin nonwoven fabric. From the viewpoint of safety, it is preferable to use a porous film containing polyethylene or polypropylene. This is because these porous films can melt at a certain temperature and block a current.

5) Container Member

As the container member, for example, a container including a laminate film or a metal container can be used.

The thickness of the laminate film is, for example, 0.5 mm or less, preferably 0.2 mm or less.

As the laminate film, a multilayer film including a plurality of resin layers and a metal layer interposed between resin layers is used. The resin layer contains, for example, a polymer material such as polypropylene (PP), polyethylene (PE), nylon, or polyethylene terephthalate (PET). The metal layer preferably contains aluminum foil or aluminum alloy foil for weight reduction. The laminate film can be formed into the shape of the container member by performing sealing by thermal fusion.

The thickness of the wall of the metal container is, for example, 1 mm or less, more preferably 0.5 mm or less, and still more preferably 0.2 mm or less.

The metal container is made by using, for example, aluminum, an aluminum alloy, or the like. The aluminum alloy preferably contains an element such as magnesium, zinc, or silicon. In a case where the aluminum alloy contains a transition metal such as iron, copper, nickel, or chromium, the content thereof is preferably 100 mass ppm or less.

The shape of the container member is not particularly limited. The shape of the container member may be, for example, a flat shape (thin shape), a square shape, a cylindrical shape, a coin shape, a button shape, or the like. The container member can be appropriately selected according to the size of the battery and the use of the battery.

6) Negative Electrode Terminal

The negative electrode terminal can be formed by using a material that is electrically stable in the potential range (vs. Li/Li$^+$) of 1.0 V or more and 3.0 V or less with respect to the oxidation-reduction potential of lithium and has conductivity. Specifically, as a material of the negative electrode terminal, copper, nickel, stainless steel, aluminum, or an aluminum alloy containing at least one element selected from the group consisting of Mg, Ti, Zn, Mn, Fe, Cu, and Si is given. As a material of the negative electrode terminal, aluminum or an aluminum alloy is preferably used. The negative electrode terminal preferably contains a similar material to that of the negative electrode current collector in order to reduce the contact resistance with the negative electrode current collector.

7) Positive Electrode Terminal

The positive electrode terminal can be formed by using a material that is electrically stable in the potential range (vs. Li/Li$^+$) of 3.0 V or more and 4.5 V or less with respect to the oxidation-reduction potential of lithium and has conductivity. As a material of the positive electrode terminal, aluminum, or an aluminum alloy containing at least one element selected from the group consisting of Mg, Ti, Zn, Mn, Fe, Cu, and Si is given. The positive electrode terminal preferably contains a similar material to that of the positive electrode current collector in order to reduce the contact resistance with the positive electrode current collector.

Next, an example of the secondary battery according to the embodiment is described more specifically with reference to the drawing.

FIG. 4 is a cross-sectional view schematically showing an example of a secondary battery according to the fourth embodiment. FIG. 5 is an enlarged cross-sectional view of part A of the secondary battery shown in FIG. 4.

A secondary battery 100 shown in FIGS. 4 and 5 includes a bag-shaped container member 2 shown in FIGS. 4 and 5, an electrode group 1 shown in FIG. 4, and an electrolyte (not shown). The electrode group 1 and the electrolyte are housed in the bag-shaped container member 2. The electrolyte (not shown) is held in the electrode group 1.

The bag-shaped container member 2 includes a laminate film including two resin layers and a metal layer interposed therebetween.

As shown in FIG. 4, the electrode group 1 is a flat wound electrode group. As shown in FIG. 5, the flat wound electrode group 1 includes a negative electrode 3, a separator 4, and a positive electrode 5. The separator 4 is interposed between the negative electrode 3 and the positive electrode 5.

The negative electrode 3 includes a negative electrode current collector 3a and a negative electrode active material-containing layer 3b. In the portion of the negative electrode 3 located in the outermost shell of the wound electrode group 1, as shown in FIG. 5, the negative electrode active material-containing layer 3b is formed only on the inner surface side of the negative electrode current collector 3a. In the other part of the negative electrode 3, the negative electrode active material-containing layer 3b is formed on both surfaces of the negative electrode current collector 3a.

The positive electrode 5 includes a positive electrode current collector 5a and positive electrode active material-containing layers 5b formed on both sides of the positive electrode current collector 5a.

As shown in FIG. 4, the negative electrode terminal 6 and the positive electrode terminal 7 are located near the outer peripheral end of the wound electrode group 1. The negative electrode terminal 6 is connected to a portion located at the outermost shell of the negative electrode current collector 3a. The positive electrode terminal 7 is connected to a portion located at the outermost shell of the positive electrode current collector 5a. The negative electrode terminal 6 and the positive electrode terminal 7 extend to the outside from the opening of the bag-shaped container member 2. A thermoplastic resin layer is provided on the inner surface of the bag-shaped container member 2, and the opening is closed by thermally fusing the thermoplastic resin layer.

Figure 7:
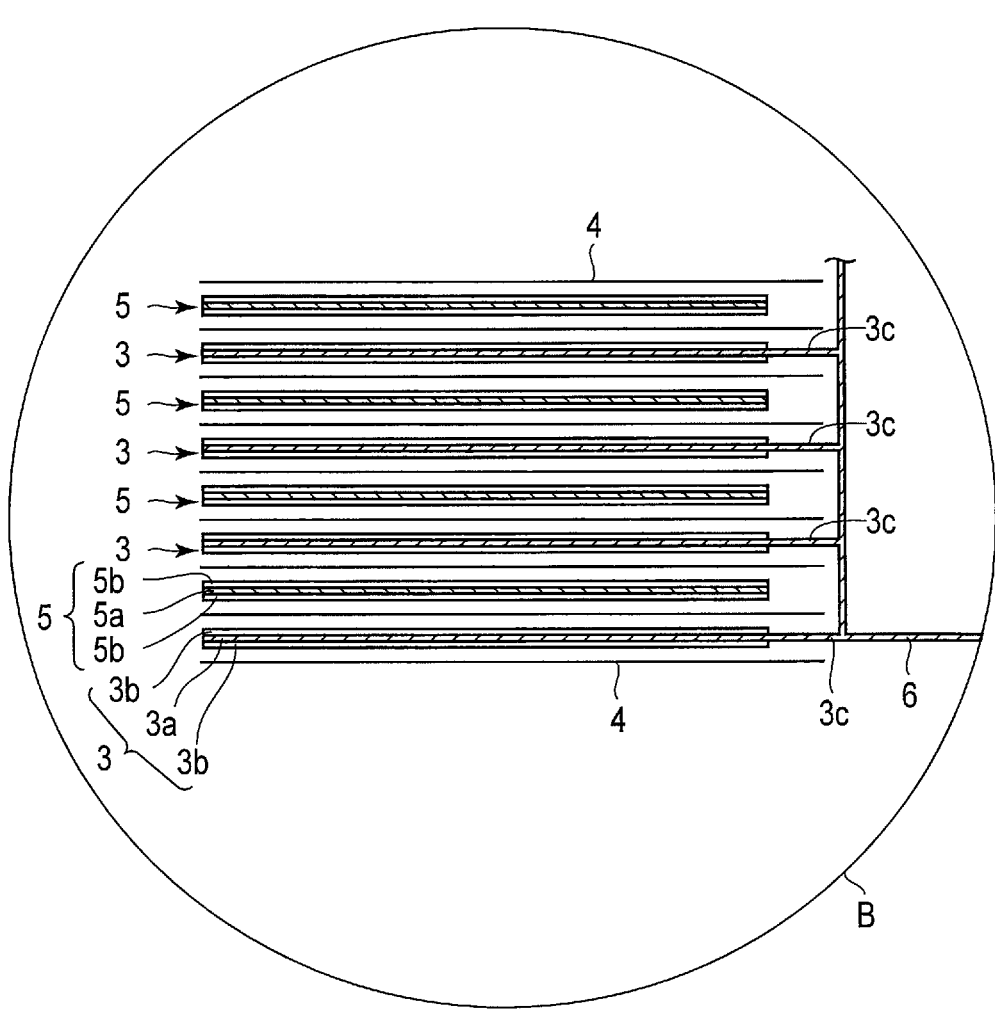
FIG. 7 is an enlarged cross-sectional view of part B of the secondary battery shown in FIG. 6.

The secondary battery according to the fourth embodiment is not limited to the secondary battery of the configuration shown in FIGS. 4 and 5, and may be, for example, a battery of the configuration shown in FIGS. 6 and 7.

FIG. 6 is a partially cutaway perspective view schematically showing another example of the secondary battery according to the fourth embodiment. FIG. 7 is an enlarged cross-sectional view of part B of the secondary battery shown in FIG. 6.

A secondary battery 100 shown in FIGS. 6 and 7 includes an electrode group 1 shown in FIGS. 6 and 7, a container member 2 shown in FIG. 6, and an electrolyte (not shown). The electrode group 1 and the electrolyte are housed in the container member 2. The electrolyte is held in the electrode group 1.

The container member 2 includes a laminate film including two resin layers and a metal layer interposed therebetween.

As shown in FIG. 7, the electrode group 1 is a stacked electrode group. The stacked electrode group 1 has a structure in which the negative electrode 3 and the positive electrode 5 are alternately stacked with the separator 4 interposed therebetween.

The electrode group 1 includes a plurality of negative electrodes 3. Each of the plurality of negative electrodes 3 includes a negative electrode current collector 3a and a negative electrode active material-containing layer 3b supported on both surfaces of the negative electrode current collector 3a. The electrode group 1 includes a plurality of positive electrodes 5. Each of the plurality of positive electrodes 5 includes a positive electrode current collector 5a and positive electrode active material-containing layers 5b supported on both surfaces of the positive electrode current collector 5a.

The negative electrode current collector 3a of each negative electrode 3 includes, on one side thereof, a portion 3c where the negative electrode active material-containing layer 3b is not supported on any surface. This portion 3c serves as a negative electrode tab. As shown in FIG. 7, the portion 3c serving as the negative electrode tab does not overlap with the positive electrode 5. The plurality of negative electrode tabs (portions 3c) are electrically connected to a belt-shaped negative electrode terminal 6. The tip of the belt-shaped negative electrode terminal 6 is drawn out of the container member 2.

Although not shown, the positive electrode current collector 5a of each positive electrode 5 includes, on one side thereof, a portion where the positive electrode active material-containing layer 5b is not supported on any surface. This portion serves as a positive electrode tab. The positive electrode tab does not overlap with the negative electrode 3 in a similar manner to the negative electrode tab (portion 3c). The positive electrode tab is located on the opposite side of the electrode group 1 with respect to the negative electrode tab (portion 3c). The positive electrode tab is electrically connected to the belt-shaped positive electrode terminal 7. The tip of the belt-shaped positive electrode terminal 7 is located on the opposite side to the negative electrode terminal 6, and is drawn out of the container member 2.

The secondary battery according to the fourth embodiment contains the active material according to the second embodiment as a negative electrode active material. Therefore, the secondary battery has high capacity and exhibits excellent rate characteristics.

Fifth Embodiment

According to a fifth embodiment, a battery module is provided. The battery module according to the fifth embodiment includes a plurality of secondary batteries according to the fourth embodiment.

In the battery module according to the fifth embodiment, the single batteries may be electrically connected in series or in parallel, or may be arranged in combination of series connection and parallel connection.

Next, an example of the battery module according to the fifth embodiment is described with reference to the drawing.

Figure 8:
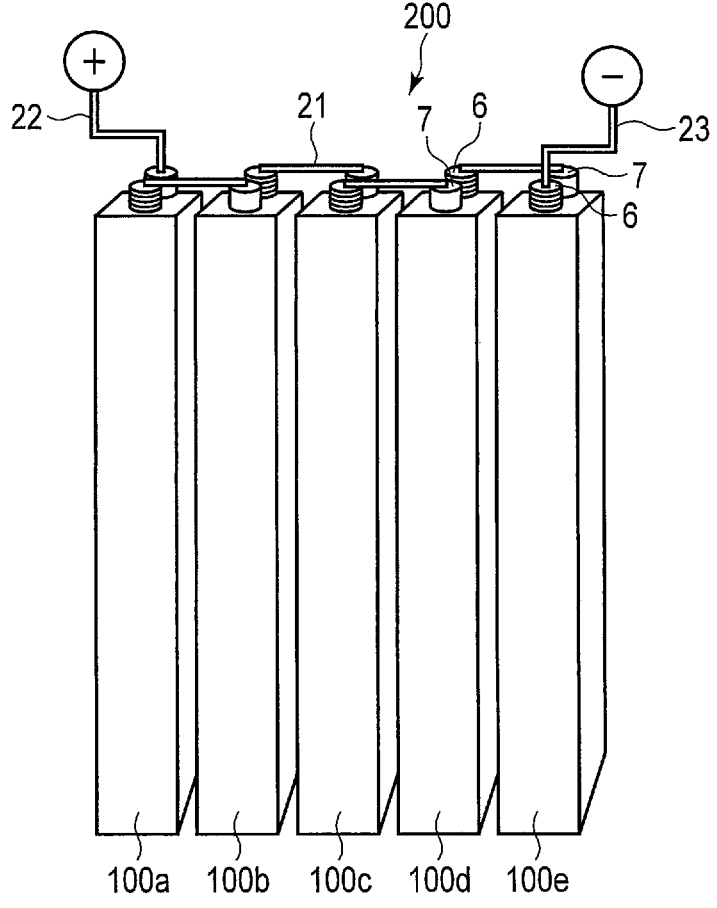
FIG. 8 is a perspective view schematically showing an example of a battery module according to an embodiment.

FIG. 8 is a perspective view schematically showing an example of a battery module according to the fifth embodiment. A battery module 200 shown in FIG. 8 includes five single batteries 100a to 100e, four bus bars 21, a positive electrode lead 22, and a negative electrode lead 23. Each of the five single batteries 100*a* to 100*e* is the secondary battery according to the fourth embodiment.

The bus bar 21 connects, for example, a negative electrode terminal 6 of one single battery 100*a* and a positive electrode terminal 7 of the adjacent single battery 100*b*. In this way, the five single batteries 100 are connected in series by the four bus bars 21. That is, the battery module 200 of FIG. 8 is a 5-series battery module.

As shown in FIG. 8, the positive electrode terminal 7 of, among the five single batteries 100*a* to 100*e*, the single battery 100*a* located at the left end is connected to the positive electrode lead 22 for external connection. The negative electrode terminal 6 of, among the five single batteries 100*a* to 100*e*, the single battery 100*e* located at the right end is connected to the negative electrode lead 23 for external connection.

The battery module according to the fifth embodiment includes a secondary battery according to the fourth embodiment. Therefore, the battery module has high capacity and exhibits excellent rate characteristics.

Sixth Embodiment

According to a sixth embodiment, a battery pack is provided. The battery pack includes the battery module according to the fifth embodiment. The battery pack may include a single secondary battery according to the fourth embodiment instead of the battery module according to the fifth embodiment.

The battery pack according to the sixth embodiment may further include a protective circuit. The protective circuit has a function of controlling charging and discharging of the secondary battery. Alternatively, a circuit included in a device using the battery pack as a power source (for example, an electronic device, an automobile, or the like) may be used as a protective circuit of the battery pack.

The battery pack according to the sixth embodiment may further include an external power distribution terminal. The external power distribution terminal is configured to output a current from the secondary battery to the outside and/or to input a current from the outside to the secondary battery. In other words, at the time of using the battery pack as a power source, a current is supplied to the outside through the external power distribution terminal. At the time of charging the battery pack, a charge current (including regenerative energy of power of an automobile or the like) is supplied to the battery pack through the external power distribution terminal.

Next, an example of the battery pack according to the embodiment is described with reference to the drawing.

Figure 9:
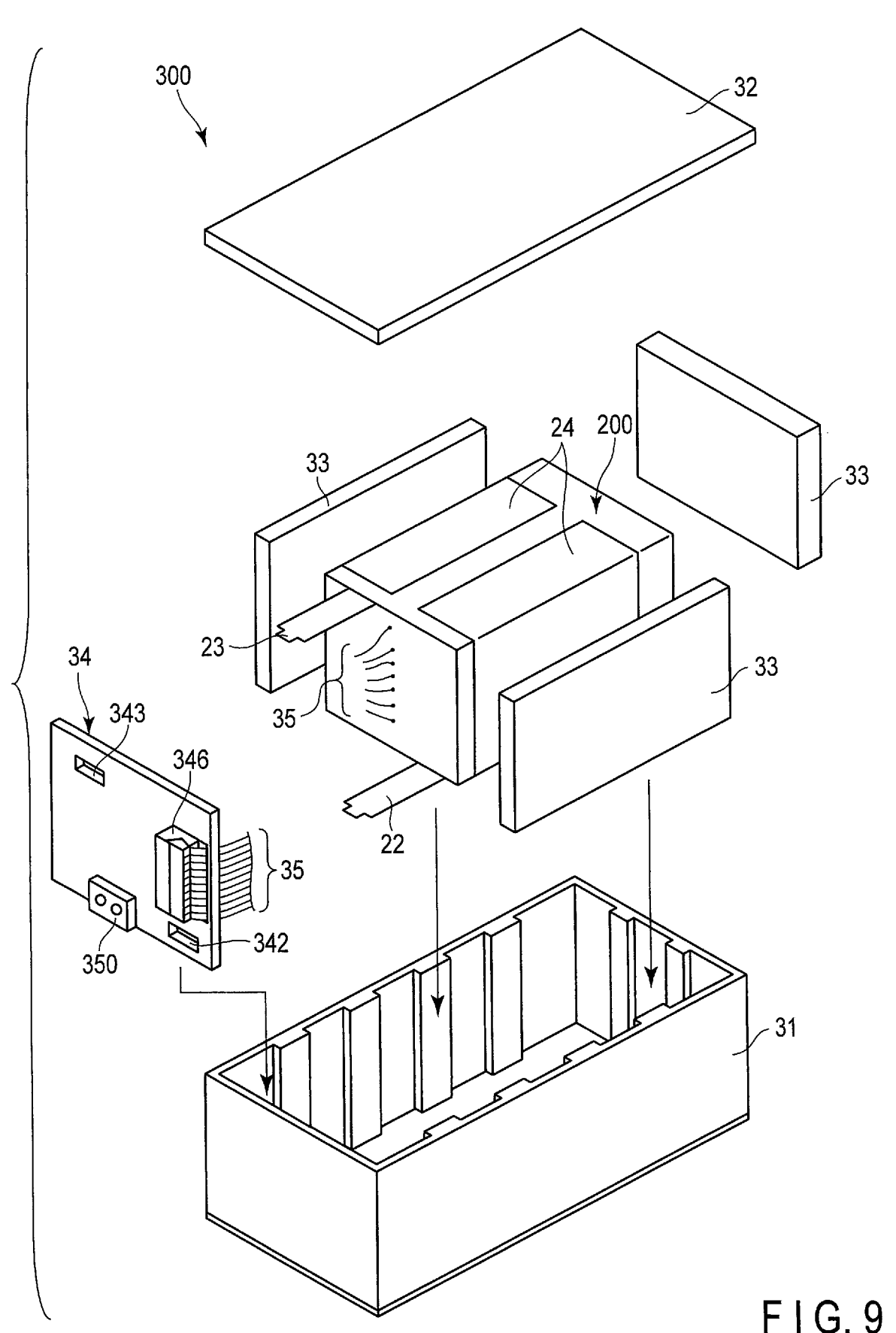
FIG. 9 is an exploded perspective view schematically showing an example of a battery pack according to the embodiment.

FIG. 9 is an exploded perspective view schematically showing an example of a battery pack. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wiring lines 35, and a not-illustrated insulating plate.

The housing container 31 shown in FIG. 9 is a bottomed square container having a rectangular bottom surface. The housing container 31 is configured to be able to house the protective sheets 33, the battery module 200, the printed wiring board 34, and the wiring lines 35. The lid 32 has a rectangular shape. The lid 32 covers the housing container 31 to house the battery module 200, etc. Although not illustrated, the housing container 31 and the lid 32 are each provided with an opening, a connection terminal, or the like for connection to an external device or the like.

The battery module 200 includes a plurality of single batteries 100, a positive electrode lead 22, a negative electrode lead 23, and an adhesive tape 24.

At least one of the single batteries 100 is the secondary battery according to the fourth embodiment. The single batteries 100 are electrically connected in series as shown in FIG. 10. The single batteries 100 may be electrically connected in parallel, or may be connected in combination of series connection and parallel connection. If the single batteries 100 are connected in parallel, the battery capacity is increased as compared to the case where they are connected in series.

The adhesive tape 24 fastens the single batteries 100. Instead of the adhesive tape 24, a heat-shrinkable tape may be used to fix the single batteries 100. In this case, protective sheets 33 are placed on both side surfaces of the battery module 200, the heat-shrinkable tape is wound around, and then the heat-shrinkable tape is heat-shrunk to bind the single batteries 100.

One end of the positive electrode lead 22 is connected to the battery module 200. The one end of the positive electrode lead 22 is electrically connected to the positive electrode of one or more single batteries 100. One end of the negative electrode lead 23 is connected to the battery module 200. The one end of the negative electrode lead 23 is electrically connected to the negative electrode of one or more single batteries 100.

The printed wiring board 34 is installed along one surface in the short side direction among the inner side surfaces of the housing container 31. The printed wiring board 34 includes a positive electrode connector 342, a negative electrode connector 343, a thermistor 345, a protective circuit 346, wiring lines 342*a* and 343*a*, an external power distribution terminal 350, a plus side wiring line (positive side wiring line) 348*a*, and a minus side wiring line (negative side wiring line) 348*b*. One main surface of the printed wiring board 34 faces one side surface of the battery module 200. A not-illustrated insulating plate is interposed between the printed wiring board 34 and the battery module 200.

The other end 22*a* of the positive electrode lead 22 is electrically connected to the positive electrode connector 342. The other end 23*a* of the negative electrode lead 23 is electrically connected to the negative electrode connector 343.

The thermistor 345 is fixed to one main surface of the printed wiring board 34. The thermistor 345 detects the temperature of each single battery 100, and transmits a detection signal of temperature to the protective circuit 346.

The external power distribution terminal 350 is fixed to the other main surface of the printed wiring board 34. The external power distribution terminal 350 is electrically connected to a device existing outside the battery pack 300. The external power distribution terminal 350 includes a positive side terminal 352 and a negative side terminal 353.

The protective circuit 346 is fixed to the other main surface of the printed wiring board 34. The protective circuit 346 is connected to the positive side terminal 352 via the plus wiring line 348*a*. The protective circuit 346 is connected to the negative side terminal 353 via the minus wiring line 348*b*. The protective circuit 346 is further electrically connected to the positive electrode connector 342 via the wiring line 342*a*. The protective circuit 346 is electrically connected to the negative electrode connector 343 via the wiring line 343a. The protective circuit 346 is further electrically connected to each single battery 100 via the wiring line 35.

The protective sheets 33 are placed on both inner side surfaces in the long side direction of the housing container 31 and on an inner side surface in the short side direction facing the printed wiring board 34 via the battery module 200. The protective sheet 33 contains, for example, resin or rubber.

The protective circuit 346 controls the charging and discharging of the single batteries 100. In addition, the protective circuit 346 interrupts the electrical connection between the protective circuit 346 and the external power distribution terminal 350 (the positive side terminal 352 and the negative side terminal 353) for power distribution to an external device based of a detection signal transmitted from the thermistor 345 or a detection signal transmitted from each single battery 100 or the battery module 200.

Examples of the detection signal transmitted from the thermistor 345 include a signal indicating that it is detected that the temperature of the single battery 100 is equal to or more than a predetermined temperature. Examples of the detection signal transmitted from each single battery 100 or the battery module 200 include a signal indicating that over-charge, over-discharge, or over-current of the single battery 100 is detected. In a case where over-charge or the like is to be detected for each single battery 100, battery voltage may be detected, or a positive electrode potential or a negative electrode potential may be detected. In the latter case, a lithium electrode used as a reference electrode is inserted into each single battery 100.

As the protective circuit 346, a circuit included in a device using the battery pack 300 as a power source (for example, an electronic device, an automobile, or the like) may be used.

As described above, the battery pack 300 includes the external power distribution terminal 350. Therefore, via the external power distribution terminal 350, the battery pack 300 can output a current from the battery module 200 to an external device, and input a current from an external device to the battery module 200. In other words, at the time of using the battery pack 300 as a power source, a current from the battery module 200 is supplied to an external device through the external power distribution terminal 350. In addition, at the time of charging the battery pack 300, a charge current from an external device is supplied to the battery pack 300 through the external power distribution terminal 350. If the battery pack 300 is used as an in-vehicle battery, regenerative energy of power of the vehicle can be used as a charge current from an external device.

The battery pack 300 may include a plurality of battery modules 200. In this case, the battery modules 200 may be connected in series, may be connected in parallel, or may be connected in combination of series connection and parallel connection. The printed wiring board 34 and the wiring lines 35 may be omitted. In this case, the positive electrode lead 22 and the negative electrode lead 23 may be used as the positive side terminal 352 and the negative side terminal 353 of the external power distribution terminal 350, respectively.

Such a battery pack is used for, for example, uses requiring excellent cycle performance in a case where a large current is taken out. Specifically, the battery pack is used as, for example, a power source of an electronic device, a stationary battery, and an in-vehicle battery of various vehicles. Examples of the electronic device include a digital camera. The battery pack is particularly suitably used as an in-vehicle battery.

The battery pack according to the sixth embodiment includes the secondary battery according to the fourth embodiment or the battery module according to the fifth embodiment. Therefore, the battery pack has high capacity and exhibits excellent rate characteristics.

Seventh Embodiment

According to a seventh embodiment, a vehicle is provided. This vehicle includes the battery pack according to the sixth embodiment.

In the vehicle, the battery pack recovers regenerative energy of power of the vehicle, for example. The vehicle may include a mechanism (regenerator) that converts kinetic energy of the vehicle into regenerative energy.

Examples of the vehicle include a two-wheel to four-wheel hybrid electric vehicle, a two-wheel to four-wheel electric vehicle, an assist bicycle, and a railway vehicle.

The mounting position of the battery pack in the vehicle is not particularly limited. For example, in a case where the battery pack is mounted on an automobile, the battery pack can be mounted in an engine room of the vehicle, in a rear portion of the car body, or under a seat.

The vehicle may be mounted with a plurality of battery packs. In this case, the batteries included in the battery packs may be electrically connected in series, may be electrically connected in parallel, or may be electrically connected in combination of series connection and parallel connection. For example, in a case where each battery pack includes a battery module, the battery modules may be electrically connected in series, may be electrically connected in parallel, or may be electrically connected in combination of series connection and parallel connection. Alternatively, in a case where each battery pack includes a single battery, the batteries may be electrically connected in series, may be electrically connected in parallel, or may be electrically connected in combination of series connection and parallel connection.

Next, an example of the vehicle according to the embodiment is described with reference to the drawing.

FIG. 11 is a partially transparent view schematically showing an example of a vehicle.

A vehicle 400 shown in FIG. 11 includes a vehicle main body 40 and the battery pack 300 according to the sixth embodiment. In the example shown in FIG. 11, the vehicle 400 is a four-wheeled automobile.

This vehicle 400 may be mounted with the plurality of battery packs 300. In this case, the batteries included by the battery pack 300 (for example, single batteries or battery modules) may be connected in series, may be connected in parallel, or may be connected in combination of series connection and parallel connection.

FIG. 11 shows an example in which the battery pack 300 is mounted in an engine room located in a front portion of the vehicle main body 40. As described above, the battery pack 300 may be mounted, for example, in a rear portion of the vehicle main body 40 or under a seat. The battery pack 300 can be used as a power source of the vehicle 400. In addition, the battery pack 300 can recover regenerative energy of power of the vehicle 400.

Next, an implementation aspect of the vehicle according to the embodiment is described with reference to FIG. 12.

FIG. 12 is a diagram schematically showing an example of a control system related to an electrical system in a vehicle. A vehicle 400 shown in FIG. 12 is an electric vehicle.

The vehicle 400 shown in FIG. 12 includes a vehicle main body 40, a vehicle power source 41, a vehicle ECU (electric control unit) 42, which is a high-ranking control device of the vehicle power source 41, an external terminal (a terminal for connection to an external power source) 43, an inverter 44, and a drive motor 45.

In the vehicle 400, the vehicle power source 41 is mounted, for example, in an engine room, in a rear portion of the car body of the automobile, or under a seat. In the vehicle 400 shown in FIG. 12, the mounting place of the vehicle power source 41 is schematically shown.

The vehicle power source 41 includes a plurality of (for example, three) battery packs 300a, 300b, and 300c, a battery management unit (BMU) 411, and a communication bus 412.

The battery pack 300a includes a battery module 200a and a voltage temperature monitoring (VTM) device 301a. The battery pack 300b includes a battery module 200b and a voltage temperature monitoring device 301b. The battery pack 300c includes a battery module 200c and a voltage temperature monitoring device 301c. Each of the battery packs 300a to 300c is a battery pack similar to the battery pack 300 described above, and each of the battery modules 200a to 200c is a battery module similar to the battery module 200 described above. The battery modules 200a to 200c are electrically connected in series. Each of the battery packs 300a, 300b, and 300c can be independently detached, and can be replaced with another battery pack 300.

Each of the battery modules 200a to 200c includes a plurality of single batteries connected in series. At least one of the single batteries is the secondary battery according to the fourth embodiment. Each of the battery modules 200a to 200c is charged and discharged through a positive electrode terminal 413 and a negative electrode terminal 414.

The battery management unit 411 communicates with the voltage temperature monitoring devices 301a to 301c, and collects information regarding voltage, temperature, etc. for each of the single batteries 100 included in the battery modules 200a to 200c included in the vehicle power source 41. Thereby, the battery management unit 411 collects information regarding maintenance of the vehicle power source 41.

The battery management unit 411 and the voltage temperature monitoring devices 301a to 301c are connected via the communication bus 412. In the communication bus 412, a set of communication lines is shared by a plurality of nodes (the battery management unit 411 and one or more of the voltage temperature monitoring devices 301a to 301c). The communication bus 412 is a communication bus configured based on, for example, a CAN (Control Area Network) standard.

The voltage temperature monitoring devices 301a to 301c measure the voltages and temperatures of the individual single batteries included in the battery modules 200a to 200c, respectively, based on a command communicated from the battery management unit 411. However, temperature may be measured simply at several places per battery module, and it is not necessary to measure the temperatures of all the single batteries.

The vehicle power source 41 may also include an electromagnetic contactor (for example, a switch device 415 shown in FIG. 12) that switches the presence or absence of electrical connection between the positive electrode terminal 413 and the negative electrode terminal 414. The switch device 415 includes a precharge switch (not illustrated) that is turned on at the time of the battery modules 200a to 200c being charged, and a main switch (not illustrated) that is turned on at the time of outputs from the battery modules 200a to 200c being supplied to a load. Each of the precharge switch and the main switch includes a relay circuit (not illustrated) that is switched on or off by a signal supplied to a coil placed near the switch element. The electromagnetic contactor such as the switch device 415 is controlled based on a control signal from the battery management unit 411 or the vehicle ECU 42 that controls the operation of the entire vehicle 400.

The inverter 44 converts an inputted direct current voltage into a three-phase alternating current (AC) high voltage for driving the motor. Three-phase output terminals of the inverter 44 are connected to respective three-phase input terminals of the drive motor 45. The inverter 44 is controlled based on a control signal from the battery management unit 411 or the vehicle ECU 42 for controlling the operation of the entire vehicle. The output voltage from the inverter 44 is adjusted by controlling the inverter 44.

The drive motor 45 is rotated by power supplied from the inverter 44. The driving force generated by the rotation of the drive motor 45 is, for example, transmitted to an axle and a drive wheel W via a differential gear unit.

Although not illustrated, the vehicle 400 includes a regenerative brake mechanism (regenerator). The regenerative brake mechanism rotates the drive motor 45 upon braking the vehicle 400, and converts kinetic energy into regenerative energy as electric energy. The regenerative energy recovered by the regenerative brake mechanism is inputted to the inverter 44, and converted into a direct current. The converted direct current is inputted to the vehicle power source 41.

One terminal of a connection line L1 is connected to the negative electrode terminal 414 of the vehicle power source 41. The other terminal of the connection line L1 is connected to a negative electrode input terminal 417 of the inverter 44. In the connection line L1, a current detection unit (current detection circuit) 416 in the battery management unit 411 is provided between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. In the connection line L2, a switch device 415 is provided between the positive electrode terminal 413 and the positive electrode input terminal 418.

An external terminal 43 is connected to the battery management unit 411. The external terminal 43 can be connected to, for example, an external power source.

In response to an operation input by a driver or the like, the vehicle ECU 42 cooperatively controls the vehicle power source 41, the switch device 415, the inverter 44, etc. together with other management units and control devices including the battery management unit 411. By cooperative control of the vehicle ECU 42, etc., output of power from the vehicle power source 41, charging of the vehicle power source 41, and the like are controlled, and the entire vehicle 400 is managed. Between the battery management unit 411 and the vehicle ECU 42, data related to maintenance of the vehicle power source 41, such as the remaining capacity of the vehicle power source 41, is transferred via a communication line.

In the vehicle according to the seventh embodiment, the battery pack according to the sixth embodiment is mounted. Therefore, according to the present embodiment, a vehicle including a battery pack that has high capacity and can exhibit excellent rate characteristics can be provided.

EXAMPLES

Examples will now be described, but the embodiment is not limited to the Examples described below.

Example 1

Preparation of Niobium-Titanium Oxide

First, $Fe_2O_3$ particles as an Fe source were mixed with $TiO_2$ particles as a Ti source to synthesize an Fe-containing Ti source powder. In the synthesis, first, $TiO_2$ particles and $Fe_2O_3$ particles were mixed such that the Fe concentration was 1200 ppm with respect to $TiO_2$ particles, and the mixture was subjected to pulverization processing using a ball mill. The pulverization processing is preferably sufficiently performed so that the average particle size of the Fe-containing Ti source powder to be obtained is about 10 nm to 20 nm. The mixture after pulverization was fired at 900° C. to obtain an Fe-containing Ti source powder.

Next, $Nb_2O_5$ particles having an average particle size of 0.4 μm, which is larger than that of the Fe-containing Ti source powder, were prepared. The obtained Fe-containing Ti source powder and the $Nb_2O_3$ particles as a Nb source were sufficiently mixed, and the resulting mixture was fired at 1000° C. for 12 hours. The firing was performed in the air. Thus, a niobium-titanium oxide powder was prepared.

Example 2

A niobium-titanium oxide powder was prepared in a similar manner to Example 1 except that $Fe_2O_3$ particles were mixed such that the Fe concentration was 600 ppm with respect to $TiO_2$ particles.

Example 3

A niobium-titanium oxide powder was prepared in a similar manner to Example 1 except for the matter described below. As a Ti source, $TiO_2$ particles not subjected to processing of Fe element mixing were used. In addition, the oxygen partial pressure was set to 85 Pa as an atmosphere during firing, and the firing temperature was set to 1000° C.

Example 4

A niobium-titanium oxide powder was prepared in a similar manner to Example 1 except for the matter described below. As a Ti source, $TiO_2$ particles not subjected to processing of Fe element mixing were used. In addition, the atmosphere during firing was set to a normal-pressure nitrogen atmosphere, and the oxygen partial pressure was set to 3.5 Pa.

Example 5

Preparation of Niobium-Titanium Oxide

First, $Cr_2O_3$ particles as a Cr source were mixed with $TiO_2$ particles as a Ti source to synthesize a Cr-containing Ti source powder. In the synthesis, first, $TiO_2$ particles and $Cr_2O_3$ particles were mixed such that the Cr concentration was 1000 ppm with respect to $TiO_2$ particles, and the mixture was subjected to pulverization processing using a ball mill. The pulverization processing is preferably sufficiently performed so that the average particle size of the Cr-containing Ti source powder to be obtained is about 10 nm to 20 nm. The mixture after pulverization was fired at 900° C. to obtain an Cr-containing Ti source powder.

Next, $Nb_2O_5$ particles having an average particle size of 0.4 μm, which is larger than that of the Cr-containing Ti source powder, were prepared. The obtained Cr-containing Ti source powder and the $Nb_2O_5$ particles as a Nb source were sufficiently mixed, and the resulting mixture was fired at 1000° C. for 12 hours. The firing was performed in the air. Thus, a niobium-titanium oxide powder was prepared.

Example 6

Preparation of Niobium-Titanium Oxide

First, $WO_3$ particles as a W source were mixed with $TiO_2$ particles as a Ti source to synthesize a W-containing Ti source powder. In the synthesis, first, $TiO_2$ particles and $WO_3$ particles were mixed such that the W concentration was 1100 ppm with respect to $TiO_2$ particles, and the mixture was subjected to pulverization processing using a ball mill. The pulverization processing is preferably sufficiently performed so that the average particle size of the W-containing Ti source powder to be obtained is about 10 nm to 20 nm. The mixture after pulverization was fired at 900° C. to obtain a W-containing Ti source powder.

Next, $Nb_2O_5$ particles having an average particle size of 0.4 μm, which is larger than that of the W-containing Ti source powder, were prepared. The obtained W-containing Ti source powder and the $Nb_2O_5$ particles as a Nb source were sufficiently mixed, and the resulting mixture was fired at 1000° C. for 12 hours. The firing was performed in the air. Thus, a niobium-titanium oxide powder was prepared.

Example 7

Preparation of Niobium-Titanium Oxide

First, $MoO_3$ particles as a Mo source were mixed with $TiO_2$ particles as a Ti source to synthesize a Mo-containing Ti source powder. In the synthesis, first, $TiO_2$ particles and $MoO_3$ particles were mixed such that the Mo concentration was 1000 ppm with respect to $TiO_2$ particles, and the mixture was subjected to pulverization processing using a ball mill. The pulverization processing is preferably sufficiently performed so that the average particle size of the Mo-containing Ti source powder to be obtained is about 10 nm to 20 nm. The mixture after pulverization was fired at 900° C. to obtain a Mo-containing Ti source powder.

Next, $Nb_2O_5$ particles having an average particle size of 0.4 μm, which is larger than that of the Mo-containing Ti source powder, were prepared. The obtained Mo-containing Ti source powder and the $Nb_2O_3$ particles as a Nb source were sufficiently mixed, and the resulting mixture was fired at 1000° C. for 12 hours. The firing was performed in the air. Thus, a niobium-titanium oxide powder was prepared.

Example 8

A niobium-titanium oxide powder was prepared in a similar manner to Example 1 except for the matter described below. $Fe_2O_3$ particles were mixed such that the Fe concentration was 560 ppm with respect to $TiO_2$ particles. In addition, the oxygen partial pressure was set to 70 Pa as an atmosphere during firing, and the firing temperature was set to 900° C.

Example 9

A niobium-titanium oxide powder was prepared in a similar manner to Example 1 except for the matter described below. $Fe_2O_3$ particles were mixed such that the Fe concentration was 620 ppm with respect to $TiO_2$ particles. In addition, the atmosphere during firing was set to a normal-pressure nitrogen atmosphere, and the oxygen partial pressure was set to 3.5 Pa.

Example 10

A niobium-titanium oxide powder was prepared in a similar manner to Example 1 except that $Fe_2O_3$ particles were mixed such that the Fe concentration was 1950 ppm with respect to $TiO_2$ particles.

Example 11

A niobium-titanium oxide powder was prepared in a similar manner to Example 1 except that $Fe_2O_3$ particles were mixed such that the Fe concentration was 250 ppm with respect to $TiO_2$ particles.

Comparative Example 1

A niobium-titanium oxide powder was prepared in a similar manner to Example 1 except that $TiO_2$ particles not subjected to processing of Fe element mixing were used as a Ti source.

Comparative Example 2

A niobium-titanium oxide powder was prepared in a similar manner to Example 1 except for the matter described below. $Fe_2O_3$ particles were mixed such that the Fe concentration was 12000 ppm with respect to $TiO_2$ particles. In addition, the oxygen partial pressure was set to 2 Pa as an atmosphere during firing, and the firing temperature was set to 1150° C.

Comparative Example 3

A niobium-titanium oxide powder was prepared in a similar manner to Example 1 except for the matter described below. As a Ti source, $TiO_2$ particles not subjected to processing of Fe element mixing were used. In addition, the oxygen partial pressure was set to 0.1 Pa as an atmosphere during firing, and the firing temperature was set to 1200° C.

Comparative Example 4

A niobium-titanium oxide powder was prepared in a similar manner to Example 4 except that the atmosphere during firing was set to a normal-pressure atmosphere with a pressure ratio between argon and nitrogen of 95:5 and the firing temperature was set to 700° C.

Comparative Example 5

A niobium-titanium oxide powder was prepared in a similar manner to Example 4 except that the atmosphere during firing was set to a normal-pressure atmosphere with a pressure ratio between argon and nitrogen of 67:33 and the firing temperature was set to 700° C.

<Various Analyses>

The niobium-titanium oxide powder prepared in each example was subjected to measurement of the L*a*b* color space, powder X-ray diffraction and ICP analysis, TEM-EDS, thermogravimetric analysis, and moisture content measurement by the Karl Fischer method according to the methods described in the first embodiment. The results of these are summarized in Table 1.

<Electrochemical Measurement>

First, N-methylpyrrolidone (NMP) was added to and mixed with 100 mass % of the niobium-titanium oxide powder obtained in each example, 10 mass % of acetylene black and 5 mass % of carbon nanofibers as a conductive agent, and 10 mass % of polyvinylidene fluoride (PVdF) as a binder to obtain a slurry. The slurry was applied to one surface of a current collector including aluminum foil having a thickness of 12 μm, and drying and subsequent pressing were performed; thus, an electrode having an electrode density of 2.4 g/cm$^3$ was produced.

Next, a $LiPF_6$ as supporting salt was dissolved at a concentration of 1 mol/L in a mixed solvent in which ethylene carbonate (EC) and diethyl carbonate (DEC) were mixed at a volume ratio of 1:2; thus, an electrolytic solution was prepared.

A coin cell in which the obtained electrode was used as a working electrode, Li metal was used as a counter electrode and a reference electrode, and the electrolytic solution was used was produced, and electrochemical characteristics were evaluated.

In the present Examples, in the coin cell for measurement, since lithium metal is used as a counter electrode, the electrode potentials of the Examples and the Comparative Examples are nobler than that of the counter electrode, and therefore the electrode operates as a positive electrode. Thus, the definition of charging and discharging in a case where the electrodes of the Examples and the Comparative Examples are used as negative electrodes is opposite. Here, in order to avoid confusion, in the present Examples, a direction in which lithium ions are inserted into the electrode is referred to as charging, and a direction in which lithium ions are extracted from the electrode is referred to as discharging. The active material of the present embodiment operates as a negative electrode by being combined with a known positive electrode material.

The produced cell for electrochemical measurement was charged and discharged in the potential range of 1.0 V to 3.0 V with a metal lithium electrode as a standard. The charge-discharge current value was set to 0.2 C (an hour discharge rate), and the 0.2 C discharge capacity was found at room temperature. In addition, the average discharge voltage was measured. The values of the 0.2 C discharge capacity and the average discharge voltage serve as indices of energy density.

In addition, the produced cell for electrochemical measurement was charged and discharged in the potential range of 1.0 V to 3.0 V with a metal lithium electrode as a standard. In order to examine rapid discharge characteristics, after the 0.2 C discharge capacity was found, charging was performed again at a charge current value of 0.2 C, and the 15 C rapid discharge capacity was found at room temperature. Then, the 15 C discharge capacity was divided by the 0.2 C discharge capacity and multiplied by 100; thus, the discharge capacity retention ratio (%) was determined. The 15 C/0.2 C discharge capacity retention ratio (%) serves as an index for evaluating rapid charge-discharge characteristics.

In addition, the cells of the Examples and the Comparative Examples were subjected in a 45° C. environment to a cycle life test in which charging and discharging at 0.2 C were repeated in the potential range of 1.0 V to 3.0 V with a metal lithium electrode as a standard. Under these conditions, charging and discharging were repeatedly performed 100 cycles (a set of charging and discharging is taken as one cycle), and the discharge capacity retention ratio after 100 cycles was examined. In order to find the discharge capacity retention ratio after 100 cycles, charging and discharging were performed again at 0.2 C (an hour discharge rate), and the discharge capacity after 100 cycles was divided by the initial discharge capacity and multiplied by 100; thus, the capacity retention ratio (%) during the cycles on the assumption that the initial discharge capacity was 100% was calculated. The discharge capacity retention ratio after 100 cycles serves as an index for evaluating cycle life characteristics. The results of the above are summarized in Table 2.

Table 3 shows the production conditions of the niobium-titanium oxide in each example.

TABLE 1

| | Lightness L* | Hue a* | Hue b* | Crystal phase | Surface layer ratio AA/AM | Center-of-gravity portion ratio AA/AM | Amount of oxygen deficiency (ppm) | Surface layer ratio AO/AM | Surface layer ratio AN/AM | Center-of-gravity portion ratio AN/AM | Amorphous phase thickness (nm) | Amount of moisture (ppm) |
|---|---|---|---|---|---|---|---|---|---|---|---|---|
| Example 1 | 98.4 | 0.7 | 4.16 | $Nb_2TiO_7/Nb_{10}Ti_2O_{29}$ | 0.09 | 0.005 | — | — | — | — | 0.1 | 450 |
| Example 2 | 98.8 | −0.64 | 2.85 | $Nb_2TiO_7/Nb_{10}Ti_3O_{29}$ | 0.07 | Not detected | — | — | — | — | 0.1 | 560 |
| Example 3 | 95.59 | −0.58 | 1.86 | $Nb_2TiO_7/Nb_{10}Ti_2O_{29}$ | — | — | 760 | 2.24 | — | — | 0.1 | 670 |
| Example 4 | 99.24 | −0.35 | 1.2 | $Nb_2TiO_7$ | — | — | 380 | 2.27 | 0.08 | Not detected | 0.1 | 625 |
| Example 5 | 98.2 | −0.42 | 3.12 | $Nb_2TiO_7/Nb_{10}Ti_2O_{29}$ | 0.09 | 0.004 | — | — | — | — | 0.1 | 432 |
| Example 6 | 97.9 | −0.02 | 2.88 | $Nb_2TiO_7/Nb_{10}Ti_2O_{29}$ | 0.07 | Not detected | — | — | — | — | 0.3 | 470 |
| Example 7 | 98.9 | −0.33 | 0.29 | $Nb_2TiO_7/Nb_{10}Ti_2O_{29}$ | 0.09 | 0.003 | — | — | — | — | 0.2 | 420 |
| Example 8 | 96.2 | 0.58 | 4.8 | $Nb_2TiO_7/Nb_{10}Ti_2O_{29}$ | 0.05 | Not detected | 200 | 2.29 | — | — | 0.4 | 580 |
| Example 9 | 96.2 | 0.42 | 4.52 | $Nb_2TiO_7/Nb_{10}Ti_2O_{29}$ | 0.05 | Not detected | — | — | 0.04 | Not detected | 0.1 | 620 |
| Example 10 | 95.3 | −0.89 | 5.82 | $Nb_2TiO_7/Nb_{10}Ti_2O_{29}$ | 0.098 | 0.007 | — | — | — | — | 0.1 | 420 |
| Example 11 | 99.45 | 0.1 | 0.02 | $Nb_2TiO_7/Nb_{10}Ti_2O_{29}$ | 0.023 | Not detected | — | — | — | — | 0.3 | 460 |
| Comparative Example 1 | 100 | −0.07 | −2.29 | $Nb_2TiO_7$ | Not detected | Not detected | 75 | 2.32 | — | — | 3.8 | 1048 |
| Comparative Example 2 | 92 | 0.85 | 7.28 | $Nb_2TiO_7/Nb_{10}Ti_2O_{29}$ | 0.27 | 0.05 | — | — | — | — | 0.1 | 704 |
| Comparative Example 3 | 92.5 | −0.2 | −3.95 | $Nb_2TiO_7/Nb_{10}Ti_2O_{29}$ | Not detected | Not detected | 2540 | 1.98 | — | — | 1.2 | 380 |
| Comparative Example 4 | 93.2 | 0.8 | 7.28 | $Nb_2TiO_7/TiN$ | — | — | 495 | 1.95 | 0.27 | 0.005 | 1.8 | 520 |
| Comparative Example 5 | 93.2 | 0.68 | 8.32 | $Nb_2TiO_7/TiN$ | — | — | 120 | 1.99 | 0.38 | 0.01 | 1.6 | 425 |

TABLE 2 / TABLE 2-continued

| | 0.2 C discharge capacity (mAh/g) | Average discharge voltage (V) | 15 C/0.2 C discharge capacity retention ratio (%) | Cycle capacity retention ratio (%) |
|---|---|---|---|---|
| Example 1 | 286 | 1.56 | 92 | 97 |
| Example 2 | 282 | 1.54 | 95 | 99 |
| Example 3 | 278 | 1.55 | 93 | 98 |
| Example 4 | 281 | 1.56 | 94 | 95 |
| Example 5 | 284 | 1.56 | 91.5 | 97 |
| Example 6 | 283 | 1.57 | 90 | 97 |
| Example 7 | 283 | 1.58 | 90 | 96 |
| Example 8 | 280 | 1.55 | 93 | 97 |
| Example 9 | 279 | 1.55 | 93.5 | 96.5 |
| Example 10 | 277 | 1.57 | 96 | 98.5 |
| Example 11 | 282 | 1.53 | 94 | 98.5 |
| Comparative Example 1 | 271 | 1.59 | 80 | 84 |
| Comparative Example 2 | 260 | 1.69 | 91 | 92 |
| Comparative Example 3 | 262 | 1.59 | 89 | 81 |
| Comparative Example 4 | 264 | 1.59 | 72 | 81 |
| Comparative Example 5 | 248 | 1.58 | 75 | 72 |

TABLE 3

| | Material during firing | Element A additive amount (vs. $TiO_2$) | Firing atmosphere under oxygen partial/reduced pressure | Firing atmosphere under oxygen partial pressure/nitrogen |
|---|---|---|---|---|
| Example 1 | Fe-containing $TiO_2$ + $Nb_2O_5$ | 1200 ppm | — | — |
| Example 2 | Fe-containing $TiO_2$ + $Nb_2O_5$ | 600 ppm | — | — |
| Example 3 | $TiO_2$ + $Nb_2O_5$ | — | 85 Pa, 1000° C. | — |
| Example 4 | $TiO_2$ + $Nb_2O_5$ | — | — | 3.5 Pa, 1000° C. |
| Example 5 | Cr-containing $TiO_2$ + $Nb_2O_5$ | 1000 ppm | — | — |
| Example 6 | W-containing $TiO_2$ + $Nb_2O_5$ | 1100 ppm | — | — |
| Example 7 | Mo-containing $TiO_2$ + $Nb_2O_5$ | 1000 ppm | — | — |
| Example 8 | Fe-containing $TiO_2$ + $Nb_2O_5$ | 560 ppm | 70 Pa, 900° C. | — |

TABLE 3-continued

| | Material during firing | Element A additive amount (vs. TiO$_2$) | Firing atmosphere under oxygen partial/ reduced pressure | Firing atmosphere under oxygen partial pressure/ nitrogen |
|---|---|---|---|---|
| Example 9 | Fe-containing TiO$_2$ + Nb$_2$O$_5$ | 620 ppm | — | 3.5 Pa, 1000° C. |
| Example 10 | Fe-containing TiO$_2$ + Nb$_2$O$_5$ | 1950 ppm | — | — |
| Example 11 | Fe-containing TiO$_2$ + Nb$_2$O$_5$ | 250 ppm | — | — |
| Comparative Example 1 | TiO$_2$ + Nb$_2$O$_5$ | — | — | — |
| Comparative Example 2 | Fe-containing TiO$_2$ + Nb$_2$O$_5$ | 12000 ppm | 2 Pa, 1150° C. | — |
| Comparative Example 3 | TiO$_2$ + Nb$_2$O$_5$ | — | 0.1 Pa, 1200° C. | — |
| Comparative Example 4 | TiO$_2$ + Nb$_2$O$_5$ | — | — | Ar/NH$_3$ = 95/5, 700° C. |
| Comparative Example 5 | TiO$_2$ + Nb$_2$O$_5$ | — | — | Ar/NH$_3$ = 67/33, 700° C. |

In Table 1, the column of "crystal phase" shows the type of the crystal phase identified by powder X-ray diffraction. The "ratio AA/AM" indicates the ratio of the content AA of the element A to the total amount AM of niobium atoms and titanium atoms. The "ratio AN/AM" indicates the ratio of the content AN of nitrogen atoms to the total amount AM of niobium atoms and titanium atoms. The "ratio AO/AM" indicates the ratio of the content AO of oxygen atoms to the total amount AM of niobium atoms and titanium atoms.

From the above results, the following can be seen.

As shown in Examples 1 to 11, all of the niobium-titanium oxides satisfying Formulae (1) to (3) below for the L*a*b* color space achieved high capacity and excellent rate characteristics. In addition, Examples 1 to 11 exhibited also high cycle capacity retention ratios.

$$95.0 \leq L^* \leq 100.0 \tag{1}$$

$$-1.0 \leq a^* \leq 1.0 \tag{2}$$

$$-1.0 \leq b^* \leq 6.0 \tag{3}$$

Comparative Example 1, in which the hue b* was less than 0.0, was inferior to the Examples in both energy density and rate characteristics. This is presumed to be because, due to the fact that the niobium-titanium oxide according to Comparative Example 1 did not contain the element A, there may have been large amounts of amorphous phases present on the particle surface and this may have led to a low hue b*.

The niobium-titanium oxide according to Comparative Example 2 excessively contained Fe as an element A and hence had a low lightness L* and an excessively high hue b*. Therefore, the band gap was narrow, and accordingly rate characteristics were relatively excellent. On the other hand, the electrode potential (negative electrode potential) was high, and accordingly the capacity was poor.

The niobium-titanium oxide according to Comparative Example 3 contained an excessive amount of oxygen deficiency. As a result, not only was the lightness L* low, but also the hue b* was excessively low. As a result, all of the capacity, rate characteristics, and cycle life characteristics were inferior to those of the Examples.

The niobium-titanium oxide according to Comparative Example 4 contained a large amount of nitrogen atoms. Therefore, the lightness L* was low, and the hue b* was excessively high. As a result of synthesis in an atmosphere of an excessive amount of nitrogen, the niobium-titanium oxide according to Comparative Example 4 further had a TiN phase as a crystal phase. The battery further containing a TiN phase in addition to Nb$_2$TiO$_7$ as the crystal phase was inferior in all of capacity, rate characteristics, and cycle life characteristics. As is clear from Table 3, etc., the niobium-titanium oxide according to Comparative Example 5, which was produced in an atmosphere of still more excessive nitrogen than in Comparative Example 4, had a very high hue b*. In addition, a TiN phase was contained like in Comparative Example 4. Therefore, in Comparative Example 5, all of the capacity, rate characteristics, and cycle life characteristics were inferior.

In Examples 1, 5, 7, and 10, the primary particle has a gradient in which the amount of the element A increases from a center-of-gravity portion of the primary particle toward a surface layer. Further, in Examples 3, 4, and 8, the amount of oxygen deficiency based on TG is in the range of 100 ppm to 10000 ppm and the ratio AO/AM satisfies $2 \leq AO/AM \leq 2.3$ in the surface layer of the primary particle. Therefore, for Examples 3, 4, and 8, it can be said that oxygen deficiency is present more in the surface layer than in the center-of-gravity portion of the niobium-titanium oxide particle.

According to at least one embodiment and Example described above, a niobium-titanium oxide is provided. The niobium-titanium oxide satisfies Formulae (1) to (3) below in the L*a*b* color space measured based on Japanese Industrial Standard JIS Z 8722:2009.

$$95.0 \leq L^* \leq 100.0 \tag{1}$$

$$-1.0 \leq a^* \leq 1.0 \tag{2}$$

$$-1.0 \leq b^* \leq 6.0 \tag{3}$$

The niobium-titanium oxide has small amounts of amorphous phases per unit volume and a moderately narrow band gap, and therefore can provide a secondary battery having high capacity and excellent rate characteristics.

Hereinafter, the invention of the embodiment will be additionally described.

<1> A niobium-titanium oxide satisfying Formulae (1) to (3) below in an L*a*b* color space according to Japanese Industrial Standard JIS Z 8722:2009:

$$95.0 \leq L^* \leq 100.0 \tag{1}$$

$$-1.0 \leq a^* \leq 1.0 \tag{2}$$

$$-1.0 \leq b^* \leq 6.0 \tag{3}$$

<2> The niobium-titanium oxide according to <1>, comprising a primary particle containing the niobium-titanium oxide, wherein the primary particle contains, as an element A, at least one selected from the group consisting of Fe, Cr, W, and Mo, the primary particle includes a surface layer defined as a region having a depth of 20 nm from a surface of the primary particle and a center-of-gravity portion present on an inside of the surface layer, and the primary particle has a gradient in which an amount of the element A increases from the center-of-gravity portion toward the surface layer.

<3> The niobium-titanium oxide according to <2>, wherein in the surface layer, a ratio AA/AM between a content AA of the element A and a total amount AM of niobium atoms and titanium atoms satisfies 0.02<AA/AM K 0.10, and in the center-of-gravity portion, the ratio AA/AM between the content AA of the element A and the total amount AM of niobium atoms and titanium atoms satisfies 0.001 AA/AM 0.01.

<4> The niobium-titanium oxide according to any one of <1> to <3>, wherein in thermogravimetric analysis in air, a weight increase of the niobium-titanium oxide in a range of 200° C. to 500° C. is in a range of 100 ppm to 10000 ppm.

<5> The niobium-titanium oxide according to any one of <1> to <4>, comprising a primary particle containing the niobium-titanium oxide, wherein the primary particle contains nitrogen atoms, the primary particle includes a surface layer defined as a region having a depth of 20 nm from a surface of the primary particle and a center-of-gravity portion present on an inside of the surface layer, and the primary particles has a gradient in which an amount of nitrogen atoms increases from the center-of-gravity portion toward the surface layer.

<6> The niobium-titanium oxide according to <5>, wherein in the surface layer, a ratio AN/AM between a content AN of nitrogen atoms and a total amount AM of niobium atoms and titanium atoms satisfies 0.01≤AN/AM≤0.3, and in the center-of-gravity portion, the ratio AN/AM between the content AN of nitrogen atoms and the total amount AM of niobium atoms and titanium atoms satisfies 0.0001 AN/AM 0.001.

<7> The niobium-titanium oxide according to any one of <1> to <6>, comprising a $Nb_2TiO_7$ phase as a main phase.

<8> The niobium-titanium oxide according to <2>, wherein, on a surface of the primary particle, an amorphous phase containing niobium and titanium is present with a thickness in a range of 0 nm to 2 nm.

<9> The niobium-titanium oxide according to any one of <1> to <8>, comprising a monoclinic $Nb_2TiO_7$ phase, wherein the monoclinic $Nb_2TiO_7$ phase is at least one selected from the group consisting of a composite oxide represented by a general formula $Li_xTi_{1-y}M1_yNb_{2-z}M2_zO_{7+\delta}$ and a composite oxide represented by a general formula $Li_xTi_{1-y}M3_{y+z}Nb_{2-z}O_{7-\delta}$, where the M1 is at least one selected from the group consisting of Zr, Si, and Sn, the M2 is at least one selected from the group consisting of V, Ta, and Bi, and the M3 is at least one selected from the group consisting of Mg, Fe, Ni, Co, W, Ta, and Mo, and the x satisfies $0 \leq x \leq 5$, the y satisfies $0 \leq y < 1$, the z satisfies $0 \leq z < 2$, and the $\delta$ satisfies $-0.3 \leq \delta \leq 0.3$.

<10> The niobium-titanium oxide according to any one of <1> to <9>, wherein an amount of adsorbed moisture according to a Karl Fischer method is 800 ppm or less.

<11> An active material comprising the niobium-titanium oxide according to any one of <1> to <10>.

<12> An electrode comprising an active material-containing layer, wherein the active material-containing layer contains the active material according to <11>.

<13> A secondary battery comprising:

a positive electrode;

a negative electrode; and an electrolyte, wherein the negative electrode is the electrode according to <12>.

<14> A battery pack comprising the secondary battery according to <13>.

<15> The battery pack according to <14>, further comprising: an external power distribution terminal; and a protective circuit.

<16> The battery pack according to <14> or <15>, comprising a plurality of secondary batteries, wherein the secondary batteries are electrically connected in series, in parallel, or in combination of series and parallel.

<17> A vehicle comprising the battery pack according to any one of <14> to <16>.

<18> The vehicle according to <17>, including a mechanism that converts kinetic energy of the vehicle into regenerative energy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A niobium-titanium oxide satisfying Formulae (1) to (3) below in an L*a*b* color space according to Japanese Industrial Standard JIS Z 8722:2009;

$$95.0 \leq L^* \leq 100.0 \tag{1}$$

$$-1.0 \leq a^* \leq 1.0 \tag{2}$$

$$-1.0 \leq b^* \leq 6.0 \tag{3}.$$

2. The niobium-titanium oxide according to claim 1, wherein the niobium-titanium oxide is a primary particle containing the niobium-titanium oxide form, the primary particle contains, as an element A, at least one selected from the group consisting of Fe, Cr, W, and Mo, the primary particle includes a surface layer defined as a region having a depth of 20 nm from a surface of the primary particle and a center-of-gravity portion present on an inside of the surface layer, and the primary particle has a gradient in which an amount of the element A increases from the center-of-gravity portion toward the surface layer.

3. The niobium-titanium oxide according to claim 2, wherein in the surface layer, a ratio AA/AM between a content AA of the element A and a total amount AM of niobium atoms and titanium atoms satisfies $0.02 \leq AA/AM \leq 0.10$, and in the center-of-gravity portion, the ratio AA/AM between the content AA of the element A and the total amount AM of niobium atoms and titanium atoms satisfies $0.001 \leq AA/AM \leq 0.01$.

4. The niobium-titanium oxide according to claim 1, wherein in thermogravimetric analysis in air, a weight increase of the niobium-titanium oxide in a range of 200° C. to 500° C. is in a range of 100 ppm to 10000 ppm.

5. The niobium-titanium oxide according to claim 1, wherein the niobium-titanium oxide is a primary particle form, the primary particle contains nitrogen atoms, the primary particle includes a surface layer defined as a region having a depth of 20 nm from a surface of the primary particle and a center-of-gravity portion present on an inside of the surface layer, and the primary particle has a gradient in which an amount of nitrogen atoms increases from the center-of-gravity portion toward the surface layer.

6. The niobium-titanium oxide according to claim 5, wherein in the surface layer, a ratio AN/AM between a content AN of nitrogen atoms and a total amount AM of niobium atoms and titanium atoms satisfies $0.01 \leq AN/AM \leq 0.3$, and in the center-of-gravity portion, the ratio AN/AM between the content AN of nitrogen atoms and the total amount AM of niobium atoms and titanium atoms satisfies $0.0001 \leq AN/AM \leq 0.001$.

7. The niobium-titanium oxide according to claim 1, comprising a $Nb_2TiO_7$ phase as a main phase.

8. The niobium-titanium oxide according to claim 2, wherein, on a surface of the primary particle, an amorphous phase containing niobium and titanium is present with a thickness in a range of 2 nm or less.

9. The niobium-titanium oxide according to claim 1, comprising a monoclinic $Nb_2TiO_7$ phase, wherein the monoclinic $Nb_2TiO_7$ phase is at least one selected from the group consisting of a composite oxide represented by a general formula $Li_xTi_{1-y}M1_yNb_{2-z}M2_zO_{7+\delta}$, and a composite oxide represented by a general formula $Li_xTi_{1-y}M3_{y+z}Nb_{2-z}O_{7-\delta}$, where the M1 is at least one selected from the group consisting of Zr, Si, and Sn, the M2 is at least one selected from the group consisting of V, Ta, and Bi, and the M3 is at least one selected from the group consisting of Mg, Fe, Ni, Co, W, Ta, and Mo, and the x satisfies $0 \leq x \leq 5$, the y satisfies $0 \leq y < 1$, the z satisfies $0 \leq z < 2$, and the $\delta$ satisfies $-0.3 \leq \delta \leq 0.3$.

10. The niobium-titanium oxide according to claim 1, wherein an amount of adsorbed moisture according to a Karl Fischer method is 800 ppm or less.

11. An active material comprising the niobium-titanium oxide according to claim 1.

12. An electrode comprising an active material-containing layer, wherein the active material-containing layer contains the active material according to claim 11.

13. A secondary battery comprising:

a positive electrode;

a negative electrode; and an electrolyte, wherein the negative electrode is the electrode according to claim 12.

14. A battery pack comprising the secondary battery according to claim 13.

15. The battery pack according to claim 14, further comprising:

an external power distribution terminal; and a protective circuit.

16. The battery pack according to claim 14, comprising a plurality of the secondary battery, wherein the secondary batteries are electrically connected in series, in parallel, or in combination of series and parallel.

17. A vehicle comprising the battery pack according to claim 14.

18. The vehicle according to claim 17, comprising a mechanism configured to convert kinetic energy of the vehicle into regenerative energy.

19. The niobium-titanium oxide according to claim 2, wherein there is no amorphous phase containing niobium and titanium on a surface of the primary particle.

* * * * *